US012737830B2

(12) United States Patent
Uhrenholt et al.

(10) Patent No.: US 12,737,830 B2
(45) Date of Patent: Sep. 15, 2026

(54) GRAPHICS PROCESSING

(71) Applicant: Arm Limited, Cambridge (GB)

(72) Inventors: Olof Henrik Uhrenholt, Lomma (SE); Philip Carlos Garcia, Austin, TX (US); Mark Underwood, Cambridge (GB)

(73) Assignee: Arm Limited, Cambridge (GB)

( * ) Notice: Subject to any disclaimer, the term of this patent is extended or adjusted under 35 U.S.C. 154(b) by 108 days.

(21) Appl. No.: 18/478,078

(22) Filed: Sep. 29, 2023

(65) Prior Publication Data

US 2025/0111462 A1 Apr. 3, 2025

(51) Int. Cl.
*G06T 1/20* (2006.01)

(52) U.S. Cl.
CPC .................................... *G06T 1/20* (2013.01)

(58) Field of Classification Search
CPC ............................. G06T 1/20; G06T 2210/52
USPC ......................................................... 345/522
See application file for complete search history.

(56) References Cited

U.S. PATENT DOCUMENTS 7,023,437 B1 4/2006 Voorhies et al.
10,013,790 B2 * 7/2018 Kakarlapudi ......... G06T 15/005
11,127,188 B1 * 9/2021 Uhrenholt ............... G06T 19/00
11,132,835 B1 * 9/2021 Uhrenholt ............... G06T 17/10
11,256,720 B1 2/2022 Hoffman
2003/0225898 A1 12/2003 Saika
2005/0195197 A1 9/2005 Wolfe
2008/0189560 A1 * 8/2008 Case ................... G06F 12/1458 713/193
2012/0304194 A1 11/2012 Engh-Halstevdt et al.
2014/0368516 A1 * 12/2014 Taggart ................. G06T 15/005 345/505
2015/0032969 A1 1/2015 Bratt
2015/0220341 A1 8/2015 Ohannessian, Jr.
2016/0110837 A1 * 4/2016 Sideris ...................... G06T 1/60 345/522
2016/0239939 A1 * 8/2016 Kakarlapudi ........... G06T 11/40
2017/0148204 A1 5/2017 Hakura et al.
2017/0212764 A1 7/2017 Lyberis
2017/0316601 A1 11/2017 Kakarlapudi et al.
2018/0158168 A1 * 6/2018 Foo ....................... G06T 15/005
2018/0165788 A1 * 6/2018 Balci ........................ G09G 5/00
2019/0088009 A1 3/2019 Forey et al.
2020/0065935 A1 * 2/2020 Yang ....................... G06T 11/40
(Continued)

OTHER PUBLICATIONS

Combined Search and Examination Report under Sections 17 and 18(3), dated Mar. 26, 2024, GB Patent Application No. GB2315009.7.

(Continued)

*Primary Examiner* — Sheree N Brown
(74) *Attorney, Agent, or Firm* — Pearl Cohen LLP

(57) ABSTRACT

When generating a sequence of render outputs using a graphics processor, the completion status of rendering tasks from different render outputs is tracked so that processing tasks for later render outputs in the sequence of outputs can be processed concurrently with processing tasks for earlier render outputs in the sequence of outputs whilst ensuring that any dependencies between the rendering tasks for the different render outputs are enforced. In particular, there is disclosed a mechanism for suspending the sequence of rendering jobs (so that it may subsequently be resumed).

19 Claims, 14 Drawing Sheets

(56) References Cited

U.S. PATENT DOCUMENTS

| | | | | |
|---|---|---|---|---|
| 2020/0111247 | A1* | 4/2020 | Heggelund | G06T 15/405 |
| 2020/0379909 | A1 | 12/2020 | Uhrenholt | |
| 2021/0192672 | A1 | 6/2021 | McCrary | |
| 2022/0020108 | A1* | 1/2022 | Uhrenholt | G06F 9/30123 |
| 2022/0101479 | A1* | 3/2022 | Alla | A63F 13/52 |
| 2023/0385106 | A1* | 11/2023 | Sideris | G06F 11/1629 |
| 2024/0078634 | A1* | 3/2024 | Yang | G06T 5/20 |
| 2024/0169645 | A1 | 5/2024 | Øygard | |
| 2024/0320896 | A1 | 9/2024 | Ma | |
| 2025/0053519 | A1 | 2/2025 | Foley | |

OTHER PUBLICATIONS

U.S. Appl. No. 18/478,657, filed Sep. 29, 2023, "Graphics Processing".
U.S. Appl. No. 18/478,121, filed Sep. 29, 2023, "Graphics Processing".
U.S. Appl. No. 18/478,131, filed Sep. 29, 2023, "Graphics Processing".
U.S. Appl. No. 18/483,972, filed Oct. 10, 2023, "Graphics Processing".
U.S. Appl. No. 18/894,496, filed Sep. 24, 2024, "Graphics Processing".
Combined Search and Examination Report under Sections 17 and 18(3), dated Feb. 4, 2025, GB Patent Application No. GB2414257.2.
Non-final Office Action dated Jun. 9, 2025, U.S. Appl. No. 18/478,657, filed Sep. 29, 2023.
Response to Office Action dated Jun. 18, 2025, U.S. Appl. No. 18/478,657, filed Sep. 29, 2023.
Non-final Office Action dated Jul. 9, 2025, U.S. Appl. No. 18/478,131, filed Sep. 29, 2023.
Non-final Office Action dated Aug. 18, 2025, U.S. Appl. No. 18/478,121, filed Sep. 29, 2023.
Final Office Action dated Aug. 19, 2025, U.S. Appl. No. 18/478,657, filed Sep. 29, 2023.
Response to Office Action dated Aug. 26, 2025, U.S. Appl. No. 18/478,131, filed Sep. 29, 2023.
Notice of Allowance dated Sep. 18, 2025, U.S. Appl. No. 18/478,131, filed Sep. 29, 2023.
Non-final Office Action dated Oct. 20, 2025, U.S. Appl. No. 18/483,972, filed Oct. 10, 2023.
Response to Office Action dated Nov. 7, 2025, U.S. Appl. No. 18/483,972, filed Oct. 10, 2023.
Notice of Allowance dated Dec. 4, 2025, U.S. Appl. No. 18/483,972, filed Oct. 10, 2023.
Response to Office Action dated Dec. 17, 2025, U.S. Appl. No. 18/478,657, filed Sep. 29, 2023.
Response to Office Action dated Dec. 18, 2025, U.S. Appl. No. 18/478,121, filed Sep. 29, 2023.
Notice of Allowance dated Feb. 3, 2026, U.S. Appl. No. 18/478,657, filed Sep. 29, 2023.
Notice of Allowance dated Feb. 3, 2026, U.S. Appl. No. 18/478,121, filed Sep. 29, 2023.
Non-final Office Action dated Mar. 18, 2026, U.S. Appl. No. 18/894,496, filed Sep. 24, 2024.
Response to Office Action dated Jun. 9, 2026, U.S. Appl. No. 18/894,496, filed Sep. 24, 2024.

* cited by examiner

Coarse counter representation of scoreboard

| | | | | |
|---|---|---|---|---|
| 61 | 0 | 0 | 0 | 0 |
| 61 | 0 | 0 | 0 | 0 |
| 61 | 0 | 0 | 0 | 0 |
| 61 | 0 | 0 | 3 | 13 |

FIG. 5B

GRAPHICS PROCESSING

BACKGROUND

The technology described herein relates to performing graphics processing, and in particular to the operation of graphics processors when performing a sequence of rendering jobs, e.g. to generate one or more outputs, e.g. frames, e.g. for display.

Graphics processing is normally carried out by first dividing the graphics processing (render) output to be rendered, such as a frame to be displayed, into a number of similar basic components of geometry to allow the graphics processing operations to be more easily carried out. These basic components of geometry may often be referred to graphics "primitives", and such "primitives" are usually in the form of simple polygons, such as triangles, points, lines, etc. (or groups thereof).

Each primitive (e.g. polygon) is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and respective primitives that use those vertices. For a given frame, there may, e.g., be of the order of a few thousand draw calls, and hundreds of thousands (or potentially millions) of primitives.

Once primitives and their vertices have been generated and defined, they can be processed by the graphics processor, in order to generate the desired graphics processing output (render target), such as a frame for display. This basically involves determining which sampling positions of an array of sampling positions associated with the render output area to be processed are covered by a primitive, and then determining the appearance each sampling position should have (e.g. in terms of its colour, etc.) to represent the primitive at that sampling position. These processes are commonly referred to as rasterising and rendering, respectively. (The term "rasterisation" is sometimes used to mean both primitive conversion to sample positions and rendering. However, herein "rasterisation" will be used to refer to converting primitive data to sampling position addresses only.)

(It will be appreciated that rasterisation-based rendering as described above is merely one approach for producing a render output and other types of rendering operation exist that may be implemented by a graphics processor including, for example, ray tracing or hybrid ray tracing rendering operations.)

One form of graphics processing uses so-called "tile-based" rendering. In tile-based rendering, the two-dimensional render output (i.e. the output of the rendering process, which may be an output frame to be displayed but could be an "intermediate" output or other suitable render target, as will be explained further below) is rendered as a plurality of smaller area regions, usually referred to as rendering "tiles", which rendering tiles can then be (and are) rendered separately. The rendered tiles are then recombined to provide the complete render output, e.g. frame, e.g. for display.

In such arrangements, the render output, e.g. frame to be displayed, is typically divided (by area) into regularly-sized and shaped rendering tiles (they are usually e.g., squares or rectangles), but this is not essential and other arrangements are possible.

(Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area regions.)

Modern graphics processors typically include one or more processing (shader) cores, that execute, inter alia, programmable processing stages, commonly referred to as "shaders", of a graphics processing pipeline that the graphics processor implements.

A graphics processor processing (shader) core is thus a processing unit that performs processing by running (typically small) programs for each "work item" in an output to be generated. In the case of generating a graphics output, such as a render target, such as a frame to be displayed, a "work item" in this regard may be a sampling position, e.g., in the case of a fragment shader, but could also be a vertex, or a ray, for example, depending on the graphics processing (shading) operation in question. In the case of compute shading operations, each "work item" in the output being generated will be, for example, the data instance (item) in the work "space" that the compute shading operation is being performed on.

In order to execute shader programs, a graphics processor will include an appropriate execution unit or units (circuit or circuits) for that purpose. The execution unit(s) will include programmable processing circuit(s) for executing shader programs (the "shaders" of graphics processing pipeline).

The actual data processing operations that are performed by the execution unit when executing that shader program are usually performed by respective functional units of the execution unit, which may include (but are not limited to) a texture mapping unit that is configured to perform certain texturing operations. Thus, the functional units will in response to and as required by instructions in a (shader) program being executed perform appropriate data processing operations.

In addition to the programmable execution unit that executes the shader programs (using its associated functional units) the graphics processor processing (shader) core may typically also include one or more essentially fixed-function (hardware) stages for implementing certain stages of the graphics processing (rendering) pipeline. These fixed-function stages can be used to handle certain fragment "frontend" processing operations for setting-up the fragment shader program (which may include, for example, primitive list reading, resource allocation, vertex fetching, rasterisation, early depth/stencil testing, but various arrangements would be possible, e.g. depending on the particular configuration of the graphics processing pipeline) and also certain post-shader actions, such as late depth/stencil testing or tile write-out.

Thus, the graphics processor processing (shader) core is operable and configured to implement an instance of the graphics processing pipeline for processing a given rendering task with the processing (shader) core operable and configured to load the required data for setting up the shader program and then executing the desired fragment shader program to perform the actual rendering operation. The output of the rendering task is then written out accordingly.

Typically there may be many parallel processing (shader) cores within a graphics processor such that the graphics processor is capable of simultaneously processing plural different rendering tasks in parallel. Thus, in a tile-based rendering system, respective tasks for processing different tiles may be issued to different processing (shader) cores such that the tiles can be rendered in parallel. This can therefore provide a more efficient graphics processor operation.

Thus, when the graphics processor receives a command to generate a particular render target, i.e. by performing a render pass whose output is the desired render target (and which render pass may generally comprise one or more rendering jobs, each rendering job comprising a respective set of rendering tasks to be processed for the desired render target), the command is then processed within a suitable command processing unit (e.g. a command stream frontend/job manager) of the graphics processor to identify the rendering jobs to be performed, and a suitable (fragment) task iterator then schedules the processing of the respective sets of rendering tasks to be performed for the rendering jobs for the render pass accordingly, with the rendering tasks being allocated to the available processing (shader) cores for processing.

Although described above in relation to a single render pass, it will be appreciated that multiple render passes may generally be performed as part of generating a single output, e.g. a single frame, e.g. for display.

For example, a given rendering job within a render pass may generate a "final" output, e.g. a frame, e.g. for display. However, in general, there may be multiple rendering jobs and multiple render passes that are performed in order to generate a given final output (frame). Thus, a given rendering job (within a given render pass) may, e.g., generate an "intermediate" output, such as a "render to texture" output (i.e. a texture), that is then used by a subsequent rendering job (e.g., within the next render pass, although it could also be used by another rendering job within the same render pass) when generating the final output, e.g. frame. This can provide a more efficient graphics processor operation, e.g. compared to simply generating the final output (frame) in full by a single rendering job (render pass).

Similarly, it will be appreciated that most graphics processing applications do not require only a single output, e.g. frame, to be generated in isolation, but rather will typically require a sequence of outputs, e.g. frames, to be generated, e.g. for a continued display.

The graphics processor when generating one or more frames may thus generally be operable and configured to perform a sequence of render passes, with each render pass comprising one or more rendering jobs for generating a respective (overall) output for that render pass. The different render passes in a sequence of render passes being performed may in some cases be independent of each other (e.g. where they relate to different frames, or exclusively write to different (data buffers). However, it is also often the case that at least some of the different render passes in a sequence of render passes being performed are related to each other. For example, this may be the case when one render pass generates a "render to texture" or other suitable "intermediate" output that is then consumed by the next render pass. There may also be dependencies between rendering jobs within a particular render pass, e.g. where a "compute" job performs calculations based on a render output produced by a preceding fragment job.

Thus, in a given sequence of rendering jobs to be performed, there may be certain data (processing) dependencies between rendering jobs that if not enforced may lead to certain artefacts in the final rendered output.

The Applicants, however, believe that there remains scope for improvements to the operation of graphics processor when performing a sequence of rendering jobs, and wherein there may be certain data (processing) dependencies between different rendering jobs in the sequence of rendering jobs being performed.

BRIEF DESCRIPTION OF DRAWINGS

A number of embodiments of the technology described herein will now be described by way of example only and with reference to the accompanying drawings, in which:

FIG. 5B shows a 'task completion status' data structure that may be used to track the completion status of rendering tasks for an associated rendering job according to a second example;

DETAILED DESCRIPTION

Figure 1:
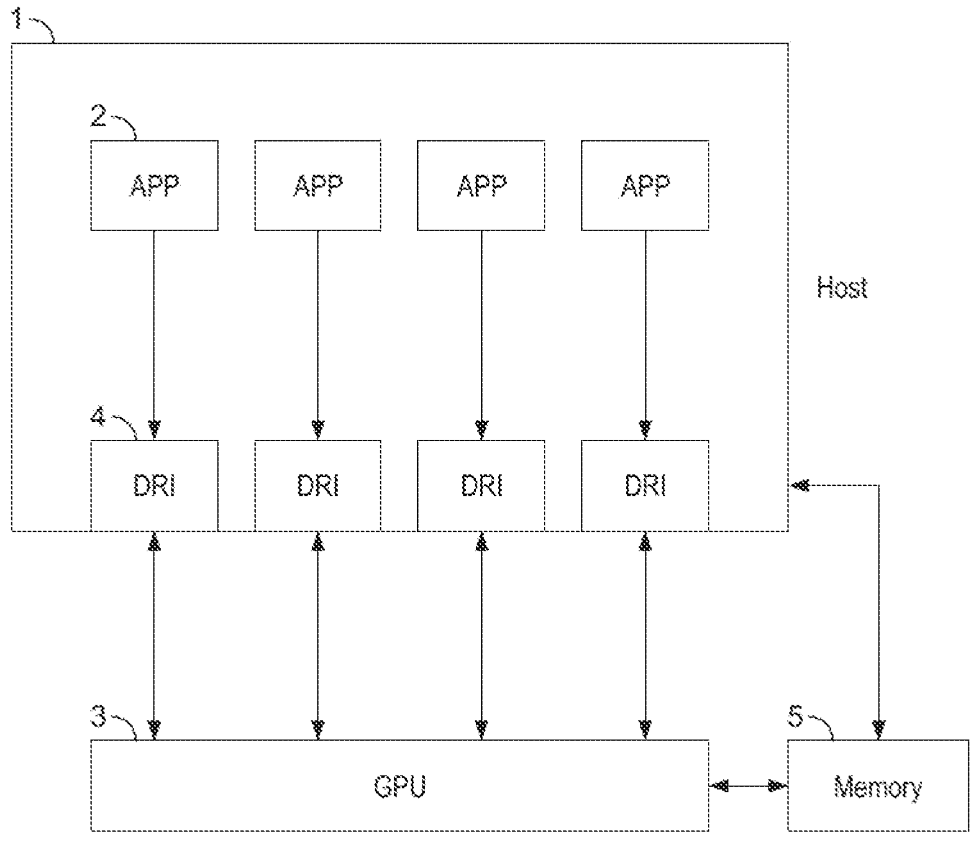
FIG. 1 shows an exemplary computer graphics processing system.

A first embodiment of the technology described herein comprises a method of operating a graphics processor when performing a sequence of rendering jobs, each rendering job including a respective set of rendering tasks to be processed to generate an output for the rendering job, wherein when performing a sequence of rendering jobs, rendering tasks for a later rendering job in the sequence of rendering jobs can be issued to a set of one or more processing cores of the graphics processor for processing concurrently with rendering tasks for an earlier rendering job in the sequence of rendering jobs, and wherein at least some processing of a rendering task for a later rendering job in the sequence of rendering jobs may depend on processing of a rendering task for an earlier rendering job in the sequence of rendering jobs, the method comprising:

in response to a command for the graphics processor to suspend performing a sequence of rendering jobs received when rendering tasks for both a first, earlier rendering job and a second, later rendering job in the sequence of rendering jobs are being concurrently processed by one or more of the graphics processor processing cores:

waiting at least until any rendering tasks for the first rendering job on which the processing of a rendering task for the second rendering job potentially depends to have completed their processing before suspending processing of the sequence of rendering jobs.

A second embodiment of the technology described herein comprises a graphics processor comprising:

a set of one or more processing cores; and a control circuit operable and configured to:

when the graphics processor is performing a sequence of rendering jobs:

wherein each rendering job includes a respective set of rendering tasks to be processed to generate an output for the rendering job, wherein when performing a sequence of rendering jobs, rendering tasks for a later rendering job in the sequence of rendering jobs can be issued to the set of processing cores of the graphics processor for processing concurrently with rendering tasks for an earlier rendering job in the sequence of render passes, and wherein at least some processing of a rendering task for a later rendering job in the sequence of rendering jobs may depend on processing of a rendering task for an earlier rendering job in the sequence of rendering jobs:

in response to a command for the graphics processor to suspend performing a sequence of rendering jobs received when rendering tasks for both a first, earlier rendering job and a second, later rendering job in the sequence of rendering jobs are being concurrently processed by one or more of the graphics processor processing cores:

cause the graphics processor to wait at least until any rendering tasks for the first rendering job on which the processing of a rendering task for the second rendering job potentially depends to have completed their processing before suspending processing of the sequence of rendering jobs.

The technology described herein relates generally to the operation of a graphics processor when performing a sequence of rendering jobs, in particular in the situation where there may be certain data (processing) dependencies between different rendering jobs in the sequence of rendering jobs that is being performed.

For instance, the graphics processor may be, and in an embodiment is, operable and configured to perform a sequence of render passes, wherein each render pass in the sequence of render passes is associated with, and generates, a respective output. Each render pass may in turn comprise one or more rendering jobs for processing (part of) the respective output for the render pass.

As mentioned above, however, the output for a given render pass may be a "final" output, e.g. a frame for display, but may also be an "intermediate" output (e.g. a "render to texture" output) that is then used by a later render pass in the sequence of render passes for generating its output. Likewise, the processing of a particular "final" output, e.g. frame, may in some cases re-use (at least some) processing of an earlier "final" output (e.g. frame). Thus, there may be certain data (processing) dependencies that should be enforced between rendering jobs for different render passes. Likewise, there may be certain data (processing) dependencies that should be enforced between different rendering jobs within the same render pass, e.g. where a "compute" job relates to an output produced by a preceding fragment rendering job, for instance, such that the "compute" job uses the data generated by the fragment rendering job. The technology described herein particularly relates to such situations where there are possible data (processing) dependencies between rendering jobs that may need to be enforced.

Each of the rendering jobs in the sequence of rendering jobs being performed in the technology described herein can be (and is) subdivided into a respective set of rendering tasks that is to be processed for an overall output (render target) for the render pass for which the rendering job is being performed for. For example, a render pass may, and generally will, include one or more fragment rendering jobs for producing a respective render output (e.g. frame) for the render pass, wherein the rendering tasks within a fragment rendering job generate respective portions (e.g. regions) of the overall output (frame). However, a particular render pass may also include various other types of rendering jobs such as "compute" jobs for performing calculations in respect of the (same) render output produced by a previous fragment rendering job within the same render pass (and wherein the rendering tasks for "compute" job may therefore, and in an embodiment do, perform such calculations in respect of certain portions (e.g. regions) of the overall output (render target)). That is, the rendering jobs within a given render pass may, and generally do, relate to the same overall output (e.g. frame), and the rendering tasks within each rendering job therefore in an embodiment relate to rendering operations (e.g. fragment shading in the case of a fragment shading job, or calculations in the case of a "compute" job) performed in respect of the same overall output for the render pass.

The graphics processor includes a set of one or more, and in an embodiment plural, processing (shader) cores that are operable to and configured to process these rendering tasks for the overall output (render target) for the rendering job. In embodiments, at least some, and in some cases all, of the rendering jobs, comprise a plurality of rendering tasks, which plural rendering tasks for the rendering job can be performed separately, e.g., and in an embodiment, in parallel across plural processing (shader) cores of the graphics processor. Each rendering task associated with a respective rendering job may therefore, and in an embodiment does, correspond to a respective portion of the overall output (render target) for the rendering job. Each rendering task thus in an embodiment corresponds to a respective instance of a graphics processing workload that can be (and is to be) executed by a respective processing (shader) core of the graphics processor.

Thus, the data (processing) dependencies between rendering tasks for different rendering jobs will typically (and in an embodiment) relate to only a portion of the overall output (e.g. the dependencies that can be handled by the technology described herein are typically data (processing) dependencies relating to certain regions of an overall render output being generated). Thus, when a rendering task within a particular rendering job performs processing relating to a certain region of a render output (e.g. where the rendering task writes data to a particular location within a data buffer (render target) corresponding to that region), any rendering tasks for later rendering jobs that require data relating to that (same) region of the render output may then have a data (processing) dependency on the earlier rendering task that needs to be managed. (On the other hand the later rendering tasks may not have any data (processing) dependencies on earlier rendering tasks that relate strictly to different regions of the render output.)

For example, and in an embodiment, the output (render target) for each rendering job is subdivided into a plurality of rendering tasks each corresponding to a respective "tile" or sub-region into which the overall render output (e.g. frame) associated with the rendering job has been subdivided for rendering purposes, i.e. for a tile-based rendering system, such that the individual rendering tasks to be processed for a particular rendering job generate respective portions (e.g. sub-regions) of the overall output (render target) associated with the rendering job. Therefore, the rendering tasks into which the rendering job is subdivided may, e.g., and in an embodiment do, correspond to (individual) rendering tiles into which the output (render target) for the rendering job has been subdivided for rendering purposes (and any references herein to rendering "tasks" may in embodiments be taken to refer to rendering "tiles"). Various arrangements would however be possible for defining suitable sets of rendering tasks to be performed within a given rendering job for generating a respective output for that rendering job.

Thus, the graphics processing workload within a given rendering job may, and in an embodiment does, involve issuing a plurality of (separate) rendering tasks (e.g. tiles) for processing, with each rendering task generating a respective render output (which is a respective portion of an overall render output associated with the rendering job), which rendering tasks may then be processed, e.g. in parallel, by respective processing (shader) cores of the graphics processor. The respective output(s) for individual rendering tasks can then be, and in an embodiment are, stored in a suitable intermediate buffer (e.g. a tile buffer in a tile-based rendering system), and once the processing of a rendering task is finished, the (final) output (or outputs) of that rendering task can then be written out accordingly, e.g. to a respective data buffer (render target) that the rendering job writes to, at which point the processing of the rendering task is complete.

Once all of the rendering tasks for a rendering job have completed their processing, and the respective outputs been written out appropriately, the rendering job is thus finished.

The graphics processor then continues in this way for the next and further rendering jobs in the sequence of rendering jobs being performed until all of the rendering jobs in the sequence of rendering jobs have finished (or until the application requiring the graphics processing stops the current sequence of rendering jobs, e.g. to generate a different sequence of outputs (e.g. frames).

The graphics processing workload for each render pass in a sequence of render passes being performed is therefore typically similar, with each render pass generally including a similar set of rendering jobs, and each rendering job including a similar set of rendering tasks to be performed (but with the different render passes producing different outputs (render targets)). The rendering tasks that are to be performed for a rendering job may be, and in an embodiment are, issued for processing in a set, e.g. predefined, order, but the processing of the rendering tasks can be (and is) allocated to the available processing (shader) cores of the graphics processor appropriately so that at least some processing of different rendering tasks is performed concurrently, e.g. in parallel, across the available processing (shader) cores. In general, the time to completion for different rendering tasks may be different and so the rendering tasks for different rendering jobs (for different render passes) may therefore complete out of order.

The allocation of rendering tasks to processing cores may thus be, and in an embodiment is, generally performed to try to balance the processing between the available processing (shader) cores of the graphics processor, and ensure higher utility of the available processing (shader) cores. Thus, a suitable task issuing circuit (task iterator) of the graphics processor may suitably control the scheduling and allocation of rendering tasks to processing (shader) cores in order to try to allocate rendering tasks to available processing (shader) cores, and hence increase utilisation of the processing (shader) cores.

However, the present Applicants recognise that there may still be instances within a particular render pass, or rendering job within a render pass, where there may be relatively lower utilisation of the available processing (shader) cores.

For example, this may particularly the case towards the end of a rendering job where there may be relatively fewer rendering tasks remaining to be completed for the rendering job compared to the number of available processing (shader) cores. Similar situations can also exist at the start of the rendering job where the workload may be focused in the fragment "frontend", without requiring full processing (shader) core utilisation. Other situations of possible low processing (shader) core utilisation may include, for example, where the rendering job is itself relatively smaller and does not include enough rendering tasks to fully utilise all of the available processing (shader) cores.

A 'rendering job' is thus a self-contained chunk of processing work including one or more rendering tasks relating to a particular render output and there may be certain data (processing) dependencies between different rendering jobs in a sequence of rendering jobs that is being performed. A rendering job may however be part of a larger 'render pass' that comprises a plurality of different types of rendering jobs relating to the same render output. As mentioned above, the data (processing) dependencies between rendering jobs may therefore be data (processing) dependencies that exist between rendering jobs for different render passes, but could also be data (processing) dependencies between rendering jobs within the same render pass.

In some more traditional graphics processing arrangements a strict (hard) processing barrier is therefore enforced between such rendering jobs such that no rendering tasks for a later processing job are issued for processing until all of the rendering tasks for an earlier processing job on which it depends have completed their processing, e.g. in case there are any potential data (processing) dependencies between the rendering jobs that need to be enforced, for example where a rendering job uses data generated by one or more previous rendering jobs.

Thus, if the rendering jobs in the sequence of rendering jobs were performed strictly one-after-another, i.e. with strict (hard) processing barriers between different rendering jobs, and hence no overlap between the processing of different rendering jobs in the processing (shader) cores (as may be done in some more traditional graphics processing arrangements), there may be significant instances of relatively lower processing (shader) core utilisation, e.g., and in particular, where the graphics processor is finishing off processing for an earlier rendering job but can't yet start to issue and processing rendering tasks for a subsequent rendering job due to the strict processing barrier between the rendering jobs.

To address this, and provide an improved graphics processor performance, as will be explained further below, embodiments of the technology described herein thus provide a mechanism to safely allow processing for separate rendering jobs to overlap in the graphics processor processing (shader) cores, i.e. such that rendering tasks for different rendering jobs are able to run concurrently (e.g. in parallel) across different processing (shader) cores of the graphics processor. This then means that the graphics processor (task issuing circuit) can start to issue rendering tasks for a second, later rendering job in a sequence of rendering jobs being performed for processing, and the processing (shader) cores can start processing those rendering tasks, without having to wait for all of the rendering tasks for the first rendering job to have completed their processing.

For example, according to embodiments, the management of any such data (processing) dependencies is effectively moved into the graphics processor processing (shader) core, and performed under control of the graphics processor, e.g. rather than enforcing a strict (hard) processing barrier between rendering jobs in the graphics processor command stream. In particular, the management of any such data (processing) dependencies (and the processing barriers) are in an embodiment enforced at the level of individual rendering tasks (or groups thereof). For instance, in some embodiments, this is done by tracking a 'task completion status' of rendering tasks (or groups thereof) within a rendering job (using a respective 'task completion status' data structure, e.g. scoreboard, that is allocated for that rendering job). When a rendering task for a later rendering job is being processed, it can thus be checked based on such tracking whether or not any rendering tasks for earlier rendering jobs on which its processing depends have completed their processing in order to control (e.g. stall) at least some processing of the rendering task for the later rendering job, as required. In other embodiments, this may be done by maintain a record of which rendering tasks are currently being processed by the graphics processor processing (shader) cores. In that case, when a rendering task for a later rendering job is being processed, it can be determined using the record whether the rendering task is dependent on any rendering tasks that are currently being processed, and appropriate control performed to enforce any "active" data (processing) dependencies. Various arrangements would be possible in this regard.

Thus, the technology described herein advantageously avoids a strict (hard) processing barrier between separate rendering jobs. The effect and benefit of this is then that the graphics processor processing (shader) cores are permitted and operable to concurrently process rendering tasks for different rendering jobs (e.g. so long as any data (processing) dependencies between the rendering jobs are enforced within the processing (shader) cores, and embodiments of the technology described herein provide various mechanisms for enforcing such data (processing) dependencies, as will be explained further below).

The technology described herein particularly relates to the situation in which the performing of a given sequence of rendering jobs, e.g. for generating a given sequence of outputs (e.g. frames), needs to be suspended, e.g. in order to allow the graphics processor to start generating a different sequence of outputs (e.g. frames) (e.g., and in an embodiment, for a different application or other (new) stream of work that requires graphics processing work). That is, in some cases, it may be desired to suspend generation of a (current) sequence of render outputs (e.g. frames), e.g. in order to allow the graphics processor to start generating a new, different render output. In that case, the suspending of the generating of the current sequence of rendering jobs should be (and in an embodiment is) performed in a controlled manner to allow the generating of the sequence of rendering jobs to subsequently be resumed from an appropriate "suspend" point at which the processing was suspended, in particular such that the processing for the sequence of rendering jobs can subsequently be resumed in such a manner that any previously completed rendering tasks are not executed again (since this is typically prohibited by the graphics processing APIs) (and this suspend/resume operation therefore allows processing to be resumed from the appropriate "suspend" point rather than having to simply discard all previous work and re-start processing the sequence of rendering jobs from the very beginning of the sequence).

For instance, it is becoming increasingly common for graphics processors to be used in data processing systems in which the graphics processor is, in effect, shared between multiple applications running concurrently. For example, this can arise in data processing systems that support hardware virtualisation using "time-slicing", in which a given graphics processor may be performing graphics processing for multiple applications (multiple virtual "systems") that are executing concurrently in a virtualised environment, with the graphics processor being shared between the different applications/systems in a time division-based manner.

In such time-divided "shared" operations, a graphics processor may be performing a certain sequence of rendering jobs for generating render outputs for a first application, but then be required to switch to producing render outputs for another application before it has completed the first render output. In that case therefore, the graphics processor will be required to suspend its processing of the sequence of rendering jobs for the first render output (for the first application), so as to be able to switch to generating the second render output (for a second application), but in such a way that it can then subsequently resume the processing of the sequence of rendering jobs for the first render output when the graphics processor returns to performing processing for the application that requires the first render output. This process may be repeated over time, as the graphics processor switches between generating render outputs for different applications that are "sharing" the graphics processor in a time-division manner.

In the technology described herein, when a command to suspend performing a (current) sequence of rendering jobs is received (which "suspend" command may arise because, e.g., as discussed above, the graphics processor is required to switch to processing a different output, e.g. for a different application that is sharing the graphics processor on a time-divided basis), rather than simply at that point immediately suspending all of the processing work that is currently in flight, e.g. by attempting to store out any and all required data, state, etc., needed to allow the processing to be resumed at a later date, in the case where the graphics processor processing cores are concurrently processing rendering tasks for multiple different rendering jobs, the graphics processor waits until any rendering tasks on which there may be an active data (processing) dependency have completed their processing before suspending the processing of the sequence of rendering jobs.

In this respect, the present Applicants have recognised that in the case when the graphics processor processing cores are concurrently processing rendering tasks for both a first, earlier rendering job and a second, later rendering job in the sequence of rendering jobs, and where the second, later rendering job has a potential data (processing) dependency on the first, earlier rendering job, a rendering task for the later rendering job may be held up by a potential data (processing) dependency on a rendering task for the earlier rendering job, such that the rendering task cannot progress until the dependency has resolved. Thus, if it were attempted to suspend the sequence of rendering jobs immediately, this may result in a "deadlock" situation where the processing of a particular rendering task for the second, later rendering job is not able to progress to the desired suspend point as its dependency on the first, earlier rendering job cannot be resolved if the first, earlier rendering job has already been suspended. The rendering task may also block other rendering tasks from progressing. Further, it may not be possible to safely terminate those rendering tasks due to the presence of possible shader side-effects.

The suspend mechanism of the technology described herein thus avoids such potential "deadlock" situations by ensuring that any rendering tasks for the earlier rendering job that may have an active data (processing) dependency are allowed to complete their processing before the sequence of rendering jobs is suspended, which in turn ensures that the second, later rendering job can be suspended as desired. The technology described herein therefore provides an efficient mechanism for suspending (and subsequently resuming) a sequence of rendering jobs, and hence an improved graphics processor operation.

The suspend operation may be performed in any suitable and desired manner and a given rendering job may generally be suspended at any suitable "suspend" point within the rendering job. For example, the "suspend" point may comprise a rendering task boundary. However, it would also be possible to suspend the rendering job at other processing boundaries, as desired.

Various arrangements would be possible in this regard.

For example, suitable suspend mechanisms may include those described in either of U.S. Pat. No. 11,127,188 or 11,132,835, or in United States Patent Application (Publication) No. 2022/0020108, all of which are assigned to Arm Limited, and the contents of which are incorporated herein in their entirety.

The suspend operation that is performed for a given rendering job may generally cause any suitable data, state, etc., that is required to be able to subsequently resume performing the rendering job at a later point to be saved/stored appropriately for later use. Various arrangements would be possible in this regard, e.g. depending on the suspend mechanism being used and the position of the "suspend" point.

In response to receiving a "suspend" command the graphics processor is thus configured to start performing an appropriate suspend mechanism to suspend the sequence of rendering jobs that is currently being performed.

In an embodiment, in response to receiving the command to suspend the performing of the sequence of rendering jobs (in response to receiving the "suspend" command), the issuing of any new rendering tasks for the second or any later rendering job in the sequence of rendering jobs for processing by the graphics processor processing cores is stopped, in an embodiment immediately. That is, once the "suspend" command is received, there is generally no need to continue issuing new rendering tasks, and this is in an embodiment not done. Note that this is generally safe because the rendering tasks for the different rendering jobs will typically be (and in an embodiment) are issued in order, such that all of the rendering tasks for an earlier rendering job are issued before any rendering tasks for a later rendering job in the sequence of rendering jobs, so that there can be no active data (processing) dependencies on any rendering tasks for the later rendering job that have not yet been issued.

However, in principle, the graphics processor could at least in some embodiments continue issuing new rendering tasks, as desired, until the graphics processor is ready to suspend the sequence of rendering jobs, and in some embodiments this may therefore be done.

In embodiments, the graphics processor is also operable and configured to suspend the processing of any rendering tasks for the second rendering job when possible, e.g., immediately, or as soon as it is possible to do so (e.g. as soon as any data (processing) dependencies are resolved). For example, the control circuit that controls the allocation of rendering tasks to processing (shader) cores can typically determine which processing (shader) cores are performing rendering tasks (only) for the second, later rendering job, and can thus immediately command those processing (shader) cores to suspend their processing (with an appropriate suspend mechanism then being implemented to do so).

Thus, in embodiments, in response to the command to suspend the performing of the sequence of rendering jobs, the method comprises identifying which processing cores are currently only processing rendering tasks for the second rendering job, and suspending the processing by the identified processing cores when possible (e.g., and in an embodiment, as soon as it is possible to do so).

However, as mentioned above, the present Applicants have recognised that in the case where the later rendering job has a potential data (processing) dependency on an earlier rendering job that is still being processed (such that the rendering jobs are being performed concurrently), any rendering tasks for the earlier rendering job that may cause an active data (processing) dependency cannot (safely) be suspended, but should instead be allowed to complete to ensure that any such data (processing) dependencies are released so that the later rendering job can be safely suspended.

Various arrangements contemplated in this regard.

In a first main embodiment, the graphics processor waits for all of the rendering tasks for the first rendering job have completed their processing before suspending processing of the sequence of rendering jobs. This then provides a safe suspend mechanism as described above. Further, the situation where different rendering jobs are being processed concurrently will typically only be towards the end of the earlier rendering job, as will be explained further below, and so waiting for all of the rendering tasks for the earlier rendering job to complete will typically not introduce significant latency.

Thus, in an embodiment, in response to the command to suspend the performing of the sequence of rendering jobs, the method comprises waiting until all of the rendering tasks for the first rendering job have completed their processing before suspending processing of the sequence of rendering jobs.

In that case, once all of the rendering tasks for the first rendering job have completed their processing, any outstanding rendering tasks for the second rendering job can then be suspended appropriately. In this case, the sequence of rendering jobs may therefore be suspended for the second rendering job, such that the sequence of rendering jobs may subsequently be resumed from a suitable "suspend" point within the second rendering job. Thus, the method may comprise subsequently resuming the second rendering job from the point at which the second rendering job was suspended (which "suspend" point may be any suitable point within the second rendering job, e.g. it could be the start of the second rendering job, but could also be a rendering task boundary, or a boundary within a rendering task, depending on the specific suspend mechanism is used).

In the first main embodiment, any rendering tasks for the second rendering job that are currently in flight can therefore be, and in an embodiment are, suspended as soon as it is possible to do so, as described above. However, it would also be possible in the first main embodiment for the graphics processor to continue processing any rendering tasks for the second rendering job that are currently in-flight until the graphics processor is ready to suspend the (entire) sequence of rendering jobs (and this may therefore be done). In this way the second rendering job may progress further before it is suspended, which can in turn allow the second rendering job to resume from a later point.

Other arrangements would however be possible for suspending the sequence of rendering jobs.

For instance, in a second main embodiment, the graphics processor may not necessarily wait for all of the rendering tasks for the first rendering job to have completed their processing, but may instead only wait for any rendering tasks that do cause active data (processing) dependencies to complete their processing, and once this is done, the first rendering job can then be safely suspended. This can further reduce latency although may require additional complexity in identifying which rendering tasks cause active data (processing) dependencies.

Various arrangements are contemplated in that regard.

However, in one particular example, this could be done by allowing any rendering tasks for the second rendering job currently in flight to complete their processing (but with no new rendering tasks for the second rendering job being issued, as above), at which point it can be determined that there are no outstanding data (processing) dependencies, and so the first rendering job can be safely suspended at that point (e.g. so long as the first rendering job is not itself dependent on any earlier rendering jobs that are also being performed concurrently).

Thus, in the second main embodiment, in response to the command to suspend the performing of the sequence of rendering jobs, the method comprises (the control circuit is configured to): stopping issuing any further rendering tasks for the second rendering job (and any further rendering jobs); and before attempting to suspend processing for the first rendering job: waiting for any rendering tasks for the second rendering job that are currently being processed to complete their processing. That is, any rendering tasks for the second rendering job that are currently in flight are therefore in an embodiment allowed to continue their processing.

Once all rendering tasks for the second rendering job that are currently being processed have completed their processing, such that there are no outstanding active dependencies between the second rendering job and the first rendering job, but there are still outstanding rendering tasks for the first rendering job to be processed, the method may then, and in an embodiment does, comprise attempting to suspend processing for the first rendering job. The first rendering job can then be suspended as described above (assuming the first rendering job has not already completed by this time, in which case there is of course no need to suspend it).

Thus, once all rendering tasks for the first rendering job on which the processing of a rendering task for the second rendering job may depend have completed their processing, but there are still outstanding rendering tasks for the first rendering job to be processed, the method may comprise suspending the outstanding rendering tasks first rendering job. In that case, the method may further comprise subsequently resuming the first rendering job from a point at which the first rendering job was suspended (which "suspend" point may again be any suitable point within the first rendering job, e.g. it could be the start of the first rendering job, but could also be a rendering task boundary, or a boundary within a rendering task, depending on the specific suspend mechanism is used). In this case, the second rendering job is in an embodiment also resumed from a point at which the second rendering job was suspended (which in the second main embodiment will typically be a task boundary, since in the second main embodiment any rendering tasks for the second rendering job that are currently being processed at the point at which the suspend command is received are allowed to complete their processing).

In some cases, e.g., and in particular, where there are in fact no active data (processing) dependencies, so that the rendering tasks for the second rendering job can drain very quickly, this approach can provide a very efficient (low latency) suspend mechanism. This approach can also easily be scaled to any number of rendering jobs that may be concurrently processed. For instance, when a sequence of two or more rendering jobs is currently in flight, the approach according to the second main embodiment may then be employed in order to suspend the sequence of rendering jobs, with the rendering jobs being suspended in reverse order until all active data (processing) dependencies are resolved, at which point the first (oldest) rendering job may be safely suspended. In that case, after waiting for any rendering tasks for the second rendering job that are currently being processed to complete their processing, the method may then comprise attempting to suspend the first rendering job, and in the case that there is an earlier (i.e. a zeroth) rendering job also in flight on which the first rendering job may depend, the suspending of the first rendering job can be done in the same way, e.g., and in an embodiment, by waiting for all rendering tasks for the first rendering job that are currently being processed have completed their processing, such that there are no outstanding active dependencies between the first rendering job and the zeroth rendering job. This can then be done similarly for each rendering job currently in flight until it is guaranteed that all outstanding active dependencies between rendering jobs have completed, at which point the overall sequence of rendering jobs can be safely suspended.

Thus, in general, in response to the command to suspend the performing of the sequence of rendering jobs, the method may, and in an embodiment does, comprise waiting until all rendering tasks that are currently being processed for one of the first and second rendering jobs to have completed their processing before suspending processing of the other one of the first and second rendering jobs. As described above, this can be done in various ways, in particular either by allowing the first rendering job to complete its processing before suspending processing for the second rendering job (as per the first main embodiment), or vice versa (as per the second main embodiment, where the rendering jobs are suspended in reverse order), e.g. so long as a suitable wait condition is applied that means that any possible active dependencies between the rendering jobs are allowed to complete before suspending performing the sequence of rendering jobs.

Thus, the technology described herein provides a safe mechanism for suspending performing a sequence of rendering jobs in particular in the situation where different rendering jobs may be performed concurrently by the processing (shader) cores of the graphics processor. In this respect, whilst certain embodiments have been described above in relation to two rendering jobs that are performed concurrently, in general, there may be a sequence of more than two rendering jobs in flight, and the technology described herein may also be used to suspend performing the sequence of rendering jobs in that case.

Once the (current) sequence of rendering jobs has been suspended appropriately, the graphics processor may thus switch to performing a new sequence of rendering jobs, e.g. to generate a new (different) render output, e.g. frame. At some later time, the graphics processor may need to switch back to the original sequence of rendering jobs whose processing was previously suspended, and this is in an embodiment done using an appropriate resume mechanism.

The resume operation can be performed in any suitable and desired manner, e.g. depending on the specific suspend mechanism that was used. Again, various arrangements would be possible in this regard, including, for example, the resume mechanisms described in either of U.S. Pat. No. 11,127,188 or 11,132,835, or in United States Patent Application (Publication) No. 2022/0020108, all of which are assigned to Arm Limited, and the contents of which are incorporated herein in their entirety.

A suitable resume operation may thus be used, and in an embodiment is used, to resume performing any rendering jobs for which the processing was previously suspended.

For example, in the situation where at the point at which the "suspend" command was received first and second rendering jobs were being performed concurrently, in the case where the first, earlier rendering job was allowed to complete its processing (e.g. according to the first main embodiment described above where the suspend operation waits for all of the rendering tasks for the earlier rendering job to complete before suspending the sequence of rendering jobs), the resume operation may be, and in an embodiment is, used to resume performing the second, later rendering job.

On the other hand, if it was the first, earlier rendering job was suspended (e.g. according to the second main embodiment described above), in that case, the resume operation is in an embodiment used to resume performing the first rendering job from the point at which the first rendering job was suspended. In that case, the resume operation may also be used to resume processing of the second, later rendering job from the point at which it was suspended. Alternatively, once the first rendering job has been resumed, the second, later rendering job could simply be resumed from the start to save having to implement the resume operation again for the second rendering job. In this respect, it will be appreciated that the resume operation will typically be a serial operation that is only operable to resume one rendering job at a time.

Various arrangements would be possible in this regard for resuming the sequence of rendering jobs. For instance, an effect and benefit of the technology described herein is that any active data (processing) dependencies are allowed to resolve during the suspend routine, such that there is no need to try to store (or re-store) any such active data (processing) dependencies, and so the resume operation for a particular rendering job can generally be performed as normal, e.g. in the same way it would be in the case where a hard (strict) processing barrier were enforced between rendering jobs.

The technology described herein may therefore provide various benefits compared to other possible approaches.

The technology described herein may generally find application in any suitable graphics processing system.

The technology described herein relates particularly to tile-based rendering systems in which a render output (e.g. a frame) is subdivided into plural rendering tiles for the purposes of rendering. In that case each rendering tile may and in an embodiment does correspond to a respective sub-region of the overall render output (e.g. frame) that is being generated. For example, a rendering tile may correspond to a rectangular (e.g. square) sub-region of the overall render output.

In embodiments the rendering is performed using rasterisation. However, it will be appreciated that the technology described herein is not necessarily limited to rasterisation-based rendering and may generally be used for other types of rendering, including ray tracing or hybrid ray tracing arrangements.

The technology described herein can be used for all forms of output that a graphics processing pipeline may be used to generate, such as frames for display, render-to-texture outputs, etc. The technology described herein can generally be used for both graphics and non-graphics (e.g. compute) workloads as well as mixed workloads.

In some embodiments, the graphics processing system comprises, and/or is in communication with, one or more memories and/or memory devices that store the data described herein, and/or store software for performing the processes described herein. The graphics processing system may also be in communication with a host microprocessor, and/or with a display for displaying images based on the data generated by the graphics processing system.

In an embodiment, the various functions of the technology described herein are carried out on a single graphics processing platform that generates and outputs the rendered data that is, e.g., written to a frame buffer for a display device.

The technology described herein can be implemented in any suitable system, such as a suitably configured micro-processor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, and pipelines of the technology described herein may comprise a suitable processor or processors, controller or controllers, functional units, circuits/circuitry, processing logic, microprocessor arrangements, etc., that are operable to perform the various functions, etc., such as appropriately configured dedicated hardware elements or processing circuits/circuitry, and/or programmable hardware elements or processing circuits/circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, if desired.

Thus the technology described herein extends to a graphics processor and to a graphics processing platform including the apparatus of or operated in accordance with any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, RAM, flash memory, CD ROM or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible medium, such as a non-transitory computer readable medium, for example, diskette, CD-ROM, ROM, RAM, flash memory or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

FIG. 1 shows a typical computer graphics processing system. An application 2, such as a game, executing on a host processor (CPU) 1 will require graphics processing operations to be performed by an associated graphics processing unit (GPU) (graphics processor) 3 that executes a graphics processing pipeline. To do this, the application will generate API (Application Programming Interface) calls that are interpreted by a driver 4 for the graphics processor 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

As shown in FIG. 1, the graphics processing system will also include an appropriate memory system 5 for use by the host CPU 1 and graphics processor 3.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, their associated data values are then stored in memory, ready for output, e.g. for display.

In the present embodiments, graphics processing is carried out in a pipelined fashion, with one or more pipeline stages operating on the data to generate the final output, e.g. frame that is displayed.

Figure 2:
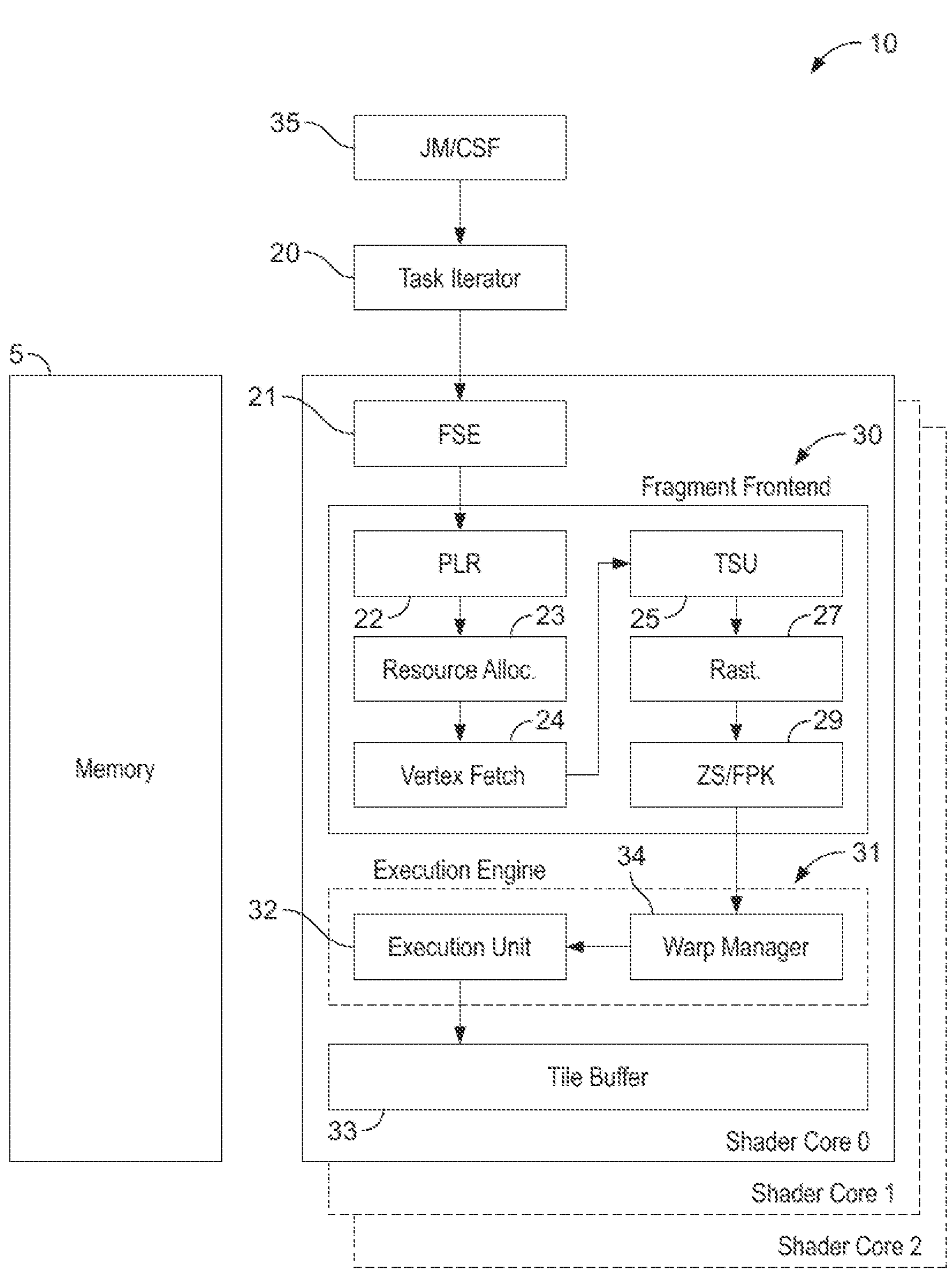
FIG. 2 shows schematically a graphics processing pipeline that can be operated in the manner of the technology described herein.

FIG. 2 shows an exemplary graphics processing pipeline 10 that may be executed by the graphics processor 3 according to an embodiment. The graphics processing pipeline 10 shown in FIG. 2 is a "tile-based" rendering system, and will thus produce tiles of an output data array, such as an output frame to be generated. Thus, an example will now be described in the context of "tile-based" rendering. In FIG. 2, the rendering is performed using rasterisation, as will be explained further below. However, it will be appreciated that the technology described herein is not necessarily limited to rasterisation-based rendering and may generally be used for other types of rendering, including ray tracing or hybrid ray tracing arrangements. Likewise, the technology described herein is not necessarily limited to tile-based rendering and may also be used for other types of rendering including immediate-mode rendering arrangements.

The output data array may typically be an output frame intended for display on a display device, such as a screen or printer, but may also, for example, comprise a "render to texture" output of the graphics processor, or other suitable arrangement.

FIG. 2 shows the main elements and pipeline stages of the graphics processing pipeline 10 according to the present embodiments. As will be appreciated by those skilled in the art, there may be other elements of the graphics processing pipeline that are not illustrated in FIG. 2.

It should also be noted here that FIG. 2 is only schematic, and that, for example, in practice the shown functional units and pipeline stages may share significant hardware circuits, even though they are shown schematically as separate stages in FIG. 2. Equally, some of the elements depicted in FIG. 2 need not be provided, and FIG. 2 merely shows one example of a graphics processing pipeline 10. It will also be appreciated that each of the stages, elements and units, etc., of the graphics processing pipeline as shown in FIG. 2 may be implemented as desired and will accordingly comprise, e.g., appropriate circuits and/or processing logic, etc., for performing the necessary operation and functions.

The graphics processing pipeline as illustrated in FIG. 2 will be executed on and implemented by the graphics processing unit (GPU) (graphics processor) 3, which will accordingly include the necessary functional units, processing circuits, etc., operable to execute the graphics processing pipeline stages.

(It will be appreciated that the graphics processing unit (GPU) (graphics processor) 3 may, and generally will, include various other functional units, processing circuits, etc., not shown in FIG. 2. This may include various functional units, processing circuits, etc., that are operable to execute non-graphics processing work. For example, in addition to graphics processing work, the graphics processing unit (GPU) (graphics processor) 3 may also be operable to perform general-purpose "compute" operations, and may therefore also include various functional units, processing circuits, etc., operable to execute such non-graphics processing work. Thus, although not shown in FIG. 2, the shader cores may for example, in addition to the fragment shader endpoint 21 that will be described below, also comprise a suitable "compute" shader endpoint that is operable and configured to issue compute tasks to the execution engine 31 for processing. The shader cores may, for example, also contain other suitable endpoints, as desired, that are operable and configured to issue other types of tasks to the execution engine 31 for processing. Various arrangements would be possible in this regard.)

FIG. 2 shows the stages of the graphics processing pipeline after a tiler (not shown) of the graphics processor has prepared the primitive lists (as the graphics processing pipeline 10 is a tile-based graphics processing pipeline).

(The tiler in effect determines which primitives need to be processed for different regions of the output. In the present embodiments, these regions may, e.g., represent a tile into which the overall output has been divided into for processing purposes, or a set of multiple such tiles. To do this, the tiler compares the location of each primitive to be processed with the positions of the regions, and adds the primitive to a respective primitive list for each region that it determines the primitive could (potentially) fall within. Any suitable and desired technique for sorting and binning primitives into tile lists, such as exact binning, or bounding box binning or anything in between, can be used for the tiling process.)

Once the tiler has completed the preparation of the primitive lists (lists of primitives to be processed for each region), then each tile can be rendered with reference to its associated primitive list(s).

To do this, each tile is processed by the graphics processing pipeline stages shown in FIG. 2.

A fragment task iterator 20 is thus provided that schedules processing work to the graphics processing pipeline 10.

The fragment task iterator 20 may thus schedule the graphics processing pipeline to generate a first output, which may, e.g. be a frame to display. In the present embodiments, wherein the graphics processing pipeline 10 is a tile-based system, in which the output has been divided into a plurality of rendering tiles, the graphics processing pipeline 10 iterates over the set of tiles for the first output, rendering each tile in turn.

As shown in FIG. 2, the graphics processor 3 includes an overall controller in the form of a job manager circuit (a command stream frontend circuit) 35, that is operable to receive tasks for the graphic processor 3 for processing from the host processor 1, which job manager 35 can then communicate the relevant jobs to respective elements of the graphics processor and graphics processing pipeline 10, via an appropriate bus/interconnect.

Thus, as shown in FIG. 2, the job manager 35 will, inter alia, issue fragment processing tasks to the fragment task iterator 20 for the fragment task iterator 20 to then schedule the appropriate fragment shading tasks to and onto the graphics processing pipeline 10.

In the present embodiments, the graphics processing pipeline 10 is implemented by means of an appropriate processing ("shader") core. In particular, as shown in FIG. 2, the graphics processor 3 includes a plurality of "shader" cores that are each configured to implement a respective parallel instance of the graphics processing pipeline 10. Thus, the fragment task iterator 20 is operable to and configured to issue tasks to different ones of the of shader cores, e.g. to try to balance processing work between the different shader cores.

(Although not shown in FIG. 2, there may be various other task iterators that control the issuing of "compute" or other tasks, etc.)

As will be explained further below, each "shader" core includes a fragment "frontend" 30 that may be, and typically is, implemented in essentially fixed-function hardware, and that performs set up for the fragment shader programs, as well as a programmable stage (execution engine 31) that executes the fragment shader programs to perform the actual rendering.

When a rendering task (i.e. tile) is allocated to a given shader core for processing, the tile is then processed (rendered) accordingly, i.e. by the graphics processing pipeline 10.

For a given tile that is being processed, a primitive list reader (or 'polygon list reader') 22 thus identifies a sequence of primitives to be processed for that tile (the primitives that are listed in the primitive list(s) for that tile), and an ordered sequence of primitives for the tile is then issued into the graphics processing pipeline 10 for processing.

A resource allocator 23 then configures and manages the allocation of memory space for the depth (Z), colour, etc., buffers 33 for the tile of the output that is being generated. These buffers may, e.g., be provided as part of RAM that is located on (local to) the graphics processing pipeline (chip).

A vertex loader 24 then loads in the vertices for the primitives, which are then passed into a primitive set-up unit (or 'triangle set-up unit') 25 that operates to determine, from the vertices for the primitives, edge information representing the primitive edges.

The edge information for the re-ordered primitives is then passed to the rasteriser 27, which rasterises the primitives into a set of one or more sampling positions and generates from the primitives individual graphics fragments having appropriate positions (representing appropriate sampling positions) for rendering the primitive.

The fragments generated by the rasteriser 27 are then sent onwards to the rest of the pipeline for processing.

For instance, in the present embodiments, the fragments generated by the rasteriser 27 are subject to (early) depth (Z)/stencil testing 29, to see if any fragments can be discarded (culled) at this stage. To do this, the Z/stencil testing stage 29 compares the depth values of (associated with) fragments issuing from the rasteriser 27 with the depth values of fragments that have already been rendered (these depth values are stored in a depth (Z) buffer that is part of the tile buffer 33) to determine whether the new fragments will be occluded by fragments that have already been rendered (or not). At the same time, an early stencil test is carried out.

Fragments that pass the fragment early Z and stencil test stage 29 may then be subject to further culling operations, such as a 'forward pixel kill' test, e.g. as described in United States Patent Application Publication No. 2019/0088009 (Arm Limited), before the remaining fragments are then passed to a fragment shading stage, in the form of an execution engine 31, for rendering.

The processing stages including the primitive list reader (or 'polygon list reader') 22 up to the (early) depth (Z)/stencil testing 29 thus together constitute a fragment "frontend" 30 that serves to set up the required data for the fragment processing operations to be performed by the execution engine 31.

The execution engine 31 then performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs for the fragments, applying textures to the fragments, applying fogging or other operations to the fragments, etc., to generate the appropriate rendered fragment data.

Thus, as shown in FIG. 2, in the present embodiment, the execution engine 31 includes a programmable execution unit (engine) 32 operable to execute fragment shader programs for respective execution threads (where each thread corresponds to one work item, e.g. an individual fragment, for the output being generated) to perform the required fragment shading operations to thereby generate rendered fragment data. The execution unit 32 can operate in any suitable and desired manner in this regard and comprise any suitable and desired processing circuits, etc.

In the present embodiments, the execution threads may be arranged into "groups" or "bundles" of threads, where the threads of one group are run in lockstep, one instruction at a time, i.e. each thread in the group executes the same single instruction before moving onto the next instruction. In this way, it is possible to share instruction fetch and scheduling resources between all the threads in a group. Such thread groups may also be referred to as "sub-groups", "warps" and "wavefronts". For convenience the term thread group will be used herein, but this is intended to encompass all equivalent terms and arrangements, unless otherwise indicated.

FIG. 2 accordingly also shows a thread group controller, in the form of a warp manager 34, that is configured to control the allocation of work items (e.g. fragments) to respective thread groups for the fragment shading operations to be performed by the programmable execution unit 32, and the issuing of thread groups to the programmable execution unit 32 for the execution of the fragment shading programs by respective thread groups.

As shown in FIG. 2, the programmable execution unit 32 is also in communication with the memory 5.

Once the fragment shading is complete, the output rendered (shaded) fragment data is written to the tile buffer 33 from where it can, for example, be output to a frame buffer (e.g. in the memory 5) for display. The depth value for an output fragment is also written appropriately to a Z-buffer within the tile buffer 33. (The tile buffer stores colour and depth buffers that store an appropriate colour, etc., or Z-value, respectively, for each sampling position that the buffers represent (in essence for each sampling position of a rendering tile that is being processed).) These buffers store an array of fragment data that represents part (a tile) of the overall output (e.g. image to be displayed), with respective sets of sample values in the buffers corresponding to respective pixels of the overall output (e.g. each 2×2 set of sample values may correspond to an output pixel, where 4× multisampling is being used).

As mentioned above, the tile buffer 33 is normally provided as part of RAM that is located on (local to) the graphics processor.

Once a tile for the output has been processed, the data from the tile buffer(s) may thus be written back to an external memory output buffer, such as a frame buffer of a display device (not shown), e.g. in the memory 5. (The display device could comprise, e.g., a display comprising an array of pixels, such as a computer monitor or a printer.)

The next tile is then processed, and so on, until sufficient tiles have been processed to generate the entire output (e.g. frame (image) to be displayed). The process is then repeated for the next output (e.g. frame) and so on.

For a given output (e.g. frame (image) to be displayed) the graphics processor will perform at least one render pass to generate the output. In general, the generation of a given output (e.g. frame (image) to be displayed) may however involve a sequence of plural render passes (with each render pass comprising potentially plural rendering jobs to be performed). This may for example include a first rendering job that generates an "intermediate" output (e.g. such as a "render to texture" output) which is then followed by a second rendering job that consumes the output from the first rendering job when generating its own output (which may be the "final" output (e.g. frame (image) to be displayed)).

Thus, a typical command stream for the tile-based graphics processor may include commands to perform a sequence of render passes, e.g. as follows:

RUN_FRAG_0

RUN_FRAG_1

. . . .

with each RUN_FRAG command corresponding to a respective fragment processing (rendering) job that is to be performed using the graphics processing pipeline.

(Note that although not shown in this example a render pass for producing a particular render output (e.g. frame) may generally comprise various different types of rendering jobs, such that a fragment processing (rendering) job within a render pass may also be followed by other types of rendering jobs that relate to the same render output. An example of this might be when a "compute" job is used to calculate 'mist' effects for a respective render output produced by a fragment processing (rendering) job. Thus, a command stream may generally also contain various other types of commands for performing other types of rendering jobs, as desired.)

Although each fragment processing (rendering) job represents a separate instance of implementing the graphics processing pipeline, there may be various data (processing) dependencies between different rendering jobs being performed. For example, in the case that one rendering job generates an "intermediate" output that is to be consumed by the next rendering job, the later rendering job should generally not be performed until the earlier rendering job has been performed. More precisely, in the case of a tile-based rendering system, where a later rendering job has a data (processing) dependency on an earlier rendering job, a particular rendering task for rendering a given tile for the later rendering job should not be performed until the equivalent tile for the earlier rendering job has been processed, so that the required portion of the render output associated with that rendering tile is available.

Thus, as mentioned above, each rendering job generally comprises a plurality of rendering tasks which may, e.g., and in the present embodiments do, correspond to respective rendering tiles into which the output (render target) for the render pass is subdivided for rendering purposes. The command stream including the RUN_FRAG commands may thus be received by the job manager circuit (a command stream frontend circuit) 35, which identifies the rendering jobs to be performed, which rendering jobs are then broken down into respective smaller rendering tasks (e.g. tiles) that are provided to the fragment task iterator 20 for the fragment task iterator 20 to then schedule the appropriate fragment shading tasks to and onto the graphics processing pipeline 10. (The rendering tasks may then be further broken down into smaller work items within the shader core.)

In order to ensure that any data (processing) dependencies between rendering jobs are enforced, the job manager circuit (a command stream frontend circuit) 35 may in some more traditional graphics processing arrangements enforce a strict (hard) processing barrier between rendering jobs (which barrier may be, and traditionally is, enforced between fragment processing (rendering) jobs for different render passes, but also between different types of rendering jobs within the same render pass), e.g. such that in the example given above all of the rendering tasks associated with the RUN_FRAG_0 command would be issued and processed to completion before the job manager circuit (a command stream frontend circuit) 35 permitted any rendering tasks associated with the RUN_FRAG_1 command to be issued for processing.

Figure 3:
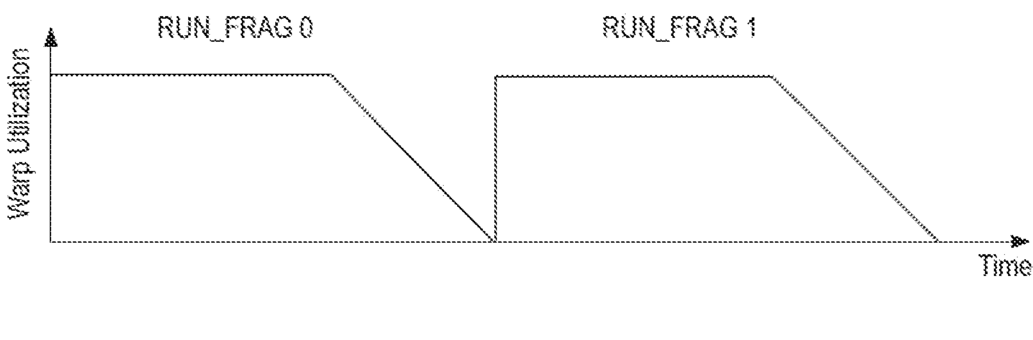
FIG. 3 illustrates a more traditional graphics processor operation in which strict processing barriers are enforced between separate rendering jobs.

This more traditional graphics processor operation is illustrated in FIG. 3. This approach works well to ensure safe graphics processing operation. However, as depicted in FIG. 3, especially towards the end of the rendering jobs, there is relatively lower warp utilisation. This is because towards the end of the rendering job, there may be fewer rendering tasks to be performed compared to the number of available shader cores. (Although not shown in FIG. 3, note that there may typically also be relatively lower warp utilisation during an initial ramp-up period). However, because of the hard (strict) processing barrier between rendering jobs, the job manager circuit (a command stream frontend circuit) 35 cannot start to issue rendering tasks for the next rendering job for processing, and so any shader cores that have completed their processing may sit idle for a number of cycles waiting for the other shader cores to finish processing their respective rendering tasks.

Figure 4:
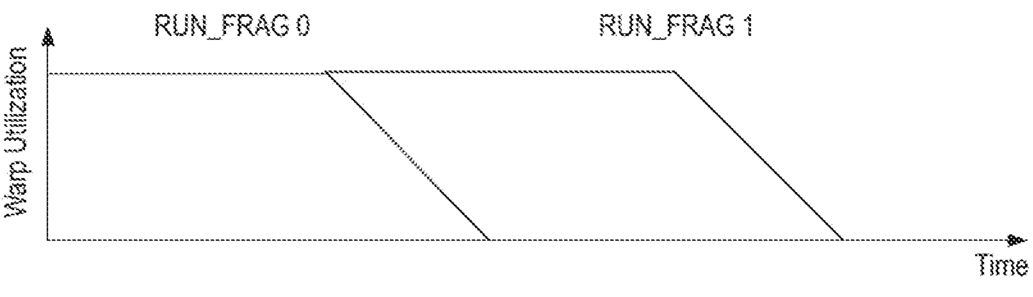
FIG. 4 illustrates an improved graphics processor operation according to embodiments of the technology described herein in which separate rendering jobs can overlap.

The present embodiments thus provide a mechanism for safely allowing separate rendering jobs to be issued for processing, and processed, concurrently, e.g. using different shader cores (although the processing could also be performed concurrently on the same shader core, e.g. so long as forward progress of the earlier rendering job can be guaranteed). This improvement is illustrated in FIG. 4, which shows that towards the end of the first rendering job (RUN_FRAG_0), the shader cores are permitted to start processing rendering tasks for the next rendering job (RUN_FRAG_1), such that the processing of rendering tasks for different rendering jobs is allowed to overlap across different shader cores, hence increasing the overall shader core utilisation.

In particular, to do this, and ensure that any data dependencies between rendering jobs can still be enforced as needed, the present embodiments track, for each rendering job that is currently in flight, the completion status of the respective rendering tasks to be performed for the rendering job in question. Based on this tracking, it is then possible to control the processing of rendering tasks for a later (e.g. the next) rendering job in a sequence of rendering jobs being performed.

Figure 5A:
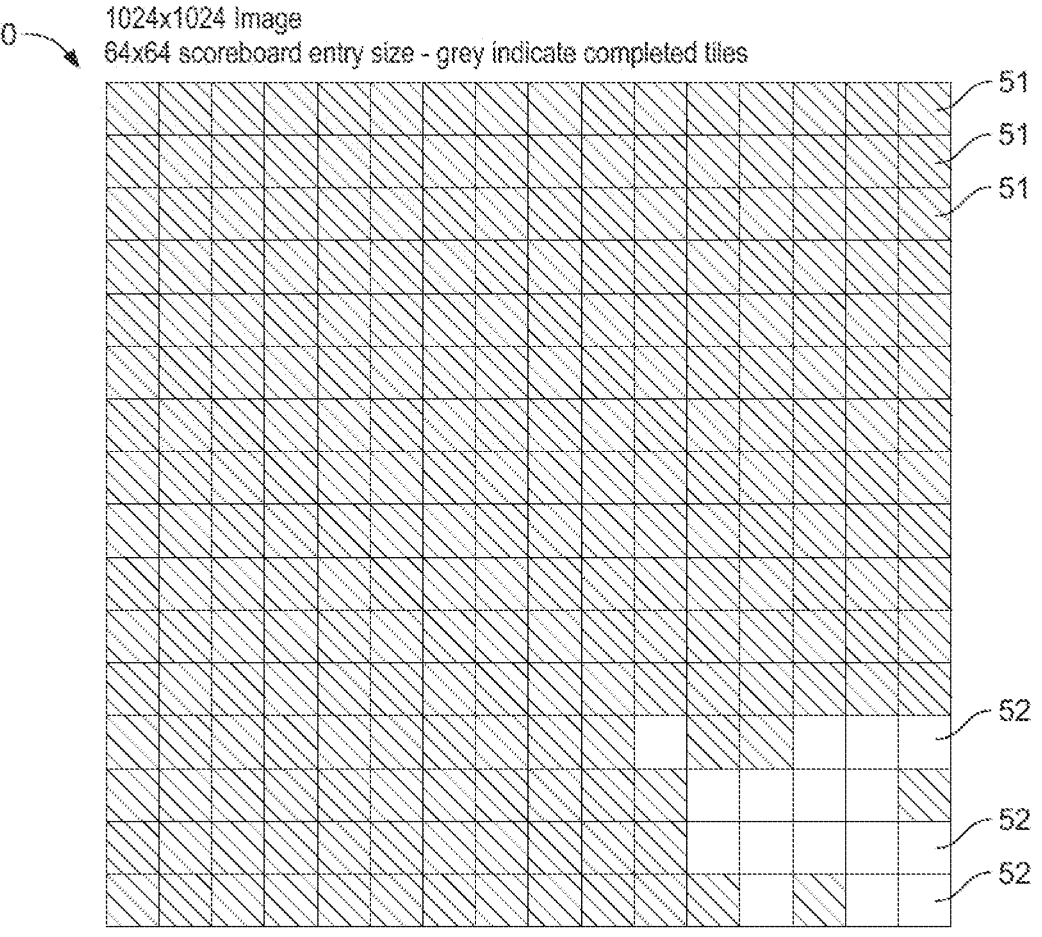
FIG. 5A shows a 'task completion status' data structure that may be used to track the completion status of rendering tasks for an associated rendering job according to a first example.

FIG. 5A shows an example of a 'task completion status' data structure 50 that may be used to track the completion status of rendering tasks for an associated rendering job. As shown in FIG. 5A, the 'task completion status' data structure 50 in this example is in the form of a tile-based "scoreboard" that is operable to track the completion status for the individual rendering tasks that the output for the rendering job is subdivided into.

For example, in the case where the render output is an 1024×1024 image, which image is subdivided for rendering purposes into a 64×64 array of rendering tiles, the 'task completion status' data structure 50 may then comprise a corresponding 64×64 array of entries, with each entry storing a (binary) indication as to whether or not the respective task (i.e. tile) associated with that entry has completed its processing. Thus, as depicted in FIG. 5A, the grey entries 51 indicate tasks (tiles) that have completed their processing, and for which a respective bit is therefore set (e.g. to '1') to indicate this, whereas the white entries 52 indicate tasks (tiles) that have not yet completed their processing (and for which the respective bit is therefore cleared (e.g. '0')).

In FIG. 5A, the 'task completion status' data structure 50 thus comprises a bit array that indicates for each rendering task (tile) to be performed for the rendering job with which the 'task completion status' data structure 50 is associated whether or not the rendering task (tile) has completed its processing. A respective 'task completion status' data structure 50 for a rendering job can thus be allocated within the fragment task iterator 20 at the start of the rendering job, and then suitably initialised. For example, any entries within the 'task completion status' data structure 50 corresponding to tasks (tiles) which reside outside of the region to which the rendering job will write to can be initially set (e.g.) to '1' to effectively indicate that those tasks (tiles) have completed their processing (since there is no processing to be done, and so there can be no data (processing) dependencies on those tasks (tiles)), whereas all other entries are cleared (e.g.) to '0' when the 'task completion status' data structure 50 is allocated, with those entries thus being updated (and set) appropriately as the corresponding rendering tasks complete. FIG. 5B shows an embodiment of a relatively coarser 'task completion status' data structure that may be used to track the completion status of rendering tasks for an associated rendering job, illustrating the same amount of completion in the example shown in FIG. 5A, but wherein rather than storing indicators for individual rendering tasks, the 'task completion status' data structure instead indicates for groups of rendering tasks (tiles) whether or not the group of rendering tasks (tiles) as a whole has completed its processing. Thus, each entry 61 in the 'task completion status' data structure in FIG. 5B represents a corresponding group of rendering tasks (tiles) (in this example 16 but in general the tracking may be performed at any suitable and desired granularity).

In FIG. 5B, rather than storing a (binary) indicator as to whether the group has completed its processing, it is instead tracked for each group of rendering tasks (tiles) how many of the rendering tasks (tiles) within the group of rendering tasks (tiles) are still being processed. In this case, the reference counts that are stored within the 'task completion status' data structure may be initialised, on allocation of the data structure, to zero. Then, as rendering tasks are issued, the respective entries will have their reference count incremented. As the rendering tasks complete their processing, the respective reference counters are accordingly decremented and once the counter for a respective group of rendering tasks (tiles) returns to zero, this indicates that the group of rendering tasks (tiles) has completed its processing. Thus, in the present example, as depicted in FIG. 5B, most of the group of rendering tasks (tiles) have completed their processing, as the respective counters have been decremented to zero. However, (and as shown in FIG. 5A which shows the tracking of the individual rendering tasks) there are still rendering tasks within the final two groups of rendering tasks that have not completed their processing and so the counters for those groups are non-zero.

Various other arrangements would of course be possible for tracking the completion status of rendering tasks, or groups thereof.

The 'task completion status' data structure, in whatever form it takes, can then be used accordingly to control the processing of rendering tasks (tiles) for the next frame to enforce any required data (processing) dependencies between rendering tasks. For instance, FIG. 6 shows an example of a so-called 'read-after-write' dependency between two render passes, where the later render pass (RenderPass2) needs to read data from render targets (ImageA and ImageB) that are written to be the earlier render pass (RenderPass1).

In this situation, the rendering tasks for any rendering jobs for the later render pass (RenderPass2) that read from these render targets (images) should therefore not be processed until the processing of the corresponding rendering tasks for the earlier render pass (RenderPass1) is complete, i.e. so that the relevant portions of the render targets (images) have been written accordingly by the rendering jobs for earlier render pass prior to any rendering jobs for the later render pass reading those portions.

Figure 6:
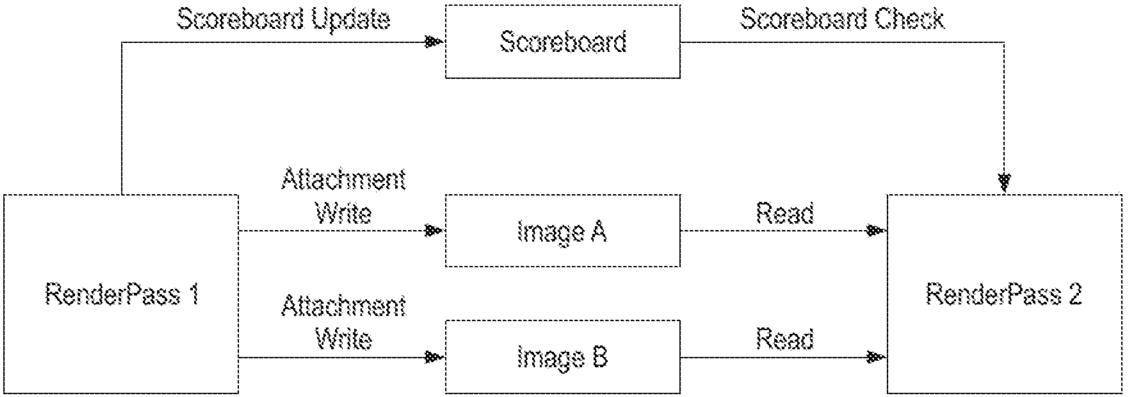
FIG. 6 shows an example of a so-called 'read-after-write' dependency between two render passes.

As shown in FIG. 6, the 'task completion status' data structure ("scoreboard") is thus updated as and when the rendering tasks for the rendering job for the earlier render pass complete. The rendering job for the later render pass is thus operable and configured to check the scoreboard appropriately prior to performing the required read operations to check whether or not the relevant rendering tasks have completed their processing. If not, the rendering tasks for the rendering job for the later render pass may be stalled until the required data is available (i.e. until the corresponding rendering task for the rendering job for the first rendering job has completed its processing and the scoreboard updated accordingly to reflect this).

Figure 7:
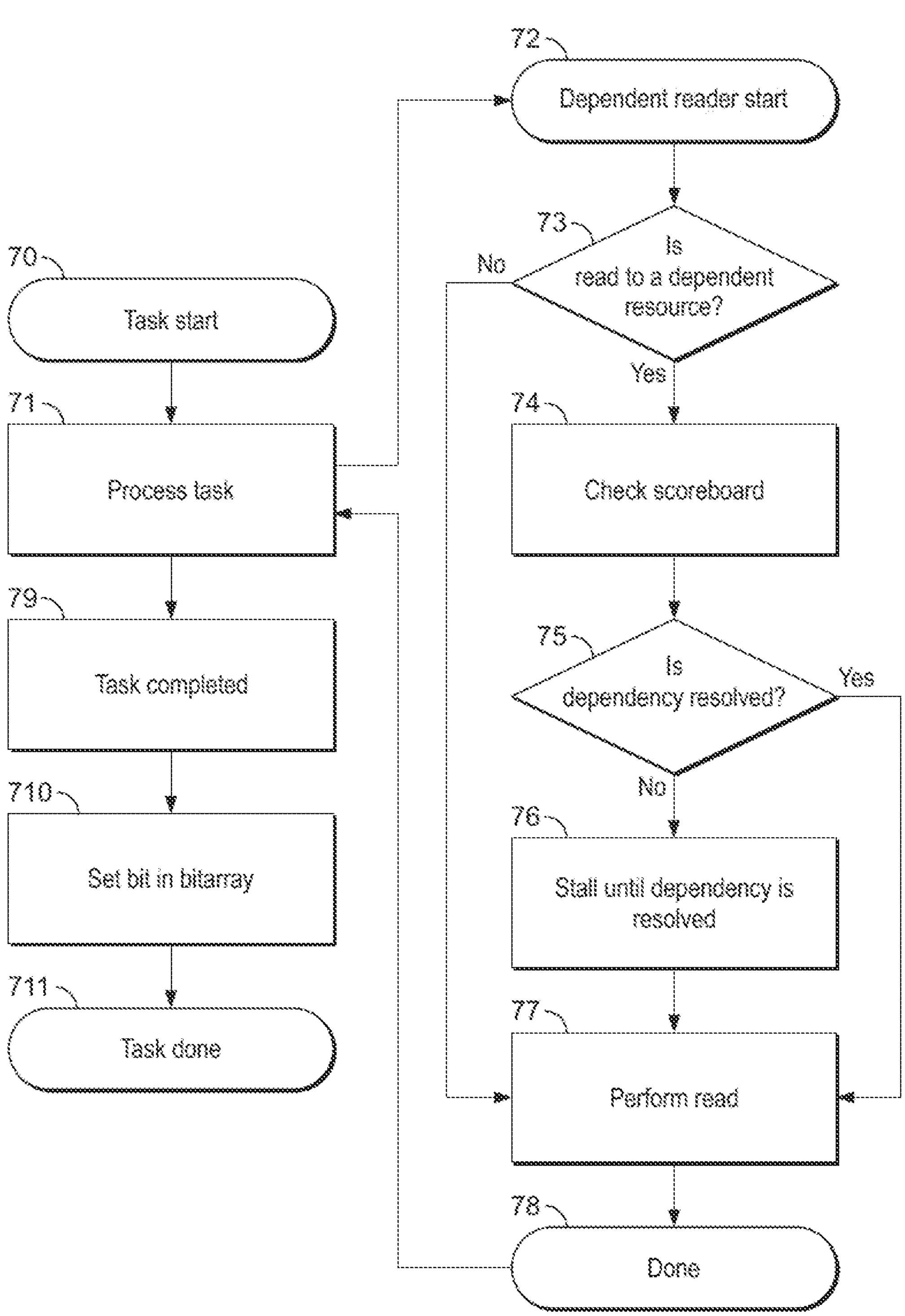
FIG. 7 is a flow chart illustrating how such data dependencies can be controlled according to embodiments.

FIG. 7 is a flow chart illustrating how such data dependencies can be controlled using the scoreboard according to the present embodiments. In particular, FIG. 7 shows the processing of a particular rendering task within a given rendering job for a particular render pass. Thus, the rendering task may be scheduled for processing by the task iterator 20 (at step 70), and the processing of the rendering task begun (step 71). At some point during the processing of the rendering task, it may be identified that there is a potential data dependency that needs to be checked before performing a read operation, and so a dependent reader routine is started (step 72), as follows.

Firstly, it is checked whether the read is to a dependent resource (step 73). If not (step 73—no), i.e. there is no data dependency, the read can then be performed immediately (step 77), and this is done, thus allowing the task to progress further.

On the other hand, if it is identified that is a potential data dependency, i.e. the read is to a dependent resource (step 73—yes), the scoreboard for the earlier rendering job on which the processing potentially depends is then checked (step 74) to see whether the dependency is released. If it can be determined that the dependency is resolved (step 75—yes), i.e. because the scoreboard check (at step 74) indicates that the corresponding rendering task for the earlier rendering job has already completed, the read can then be performed (step 77), and this is done, as described above.

However, if it cannot be determined that the dependency is resolved (step 75—no), i.e. because the scoreboard check (at step 74) indicates that the corresponding rendering task for the earlier rendering job has not completed its processing, the read cannot be performed, and so the read is stalled until it can be determined that the dependency is resolved (step 76). In this case, when the corresponding rendering task for the earlier rendering job complete, the associated scoreboard for the earlier render pass will be updated, such that the dependency is resolved, and at some point the stall will be released, so that the read can be performed (step 77), and so the task can progress further.

It will be appreciated that a single rendering task may spawn many execution threads which execute a multitude of shader programs and each thread may perform multiple reads. Each of these memory accesses may need to perform a dependency check as described above (i.e. in steps 73 to 77). Once all of the threads for the rendering task have completed their processing (step 78), the processing of the rendering task can be completed (step 79), with the tile outputs being written to memory, and an appropriate update being performed to the respective scoreboard for the rendering job to indicate that the task has completed its processing (step 710). The rendering task is then done (step 711).

Figure 8A:
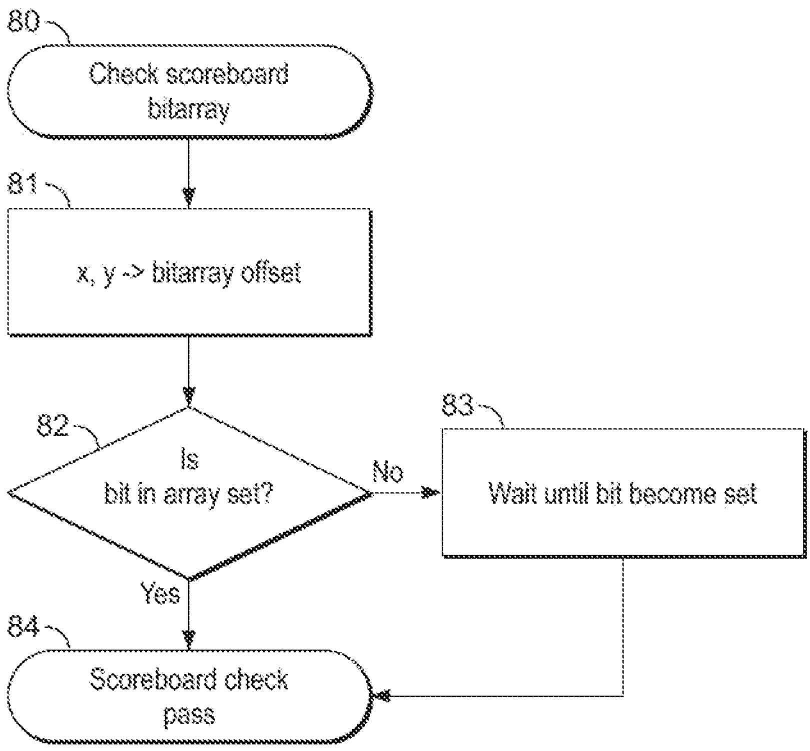
FIG. 8A illustrates the use of the 'task completion status' data structure according to FIG. 5A.

FIG. 8A illustrates the checking of the scoreboard (i.e. at step 74) according to FIG. 5A. In this example, when it is needed to check the scoreboard bit array in respect of a rendering task (step 80, corresponding to step 74 in FIG. 7), it is then identified which position in the scoreboard for the earlier rendering job corresponds to the rendering task on which the current rendering task potentially depends (step 81) (e.g. by working out which bit in the bit array corresponds to the position of the rendering tile to which the rendering task relates).

If the bit is not set, indicating that the corresponding rendering task for the earlier render pass has not yet completed its processing (step 82—no), this means that it cannot be determined that the dependency has resolved, and so the read should stall. Thus, the processing waits until the scoreboard is updated (step 83) and the scoreboard check can be passed (step 84). Whereas, if the bit is set, indicating that the corresponding rendering task for the earlier render pass has completed its processing, it is determined on this basis that the dependency has resolved, and the scoreboard check can be passed (step 84).

Figure 8B:
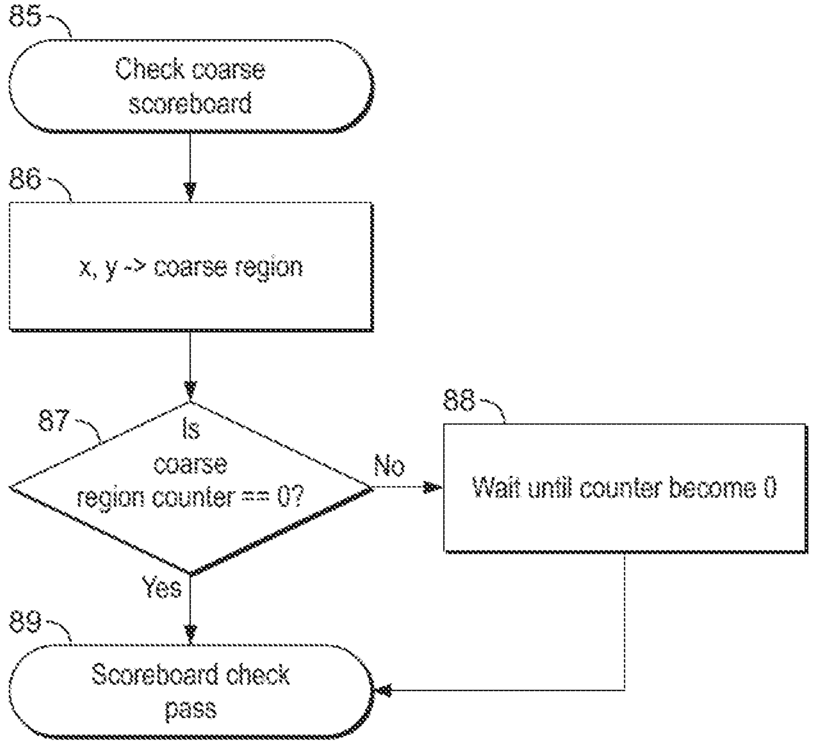
FIG. 8B illustrates the use of the 'task completion status' data structure according to FIG. 5B.

FIG. 8B shows a corresponding checking of the scoreboard according to FIG. 5B. In this case, when it is needed to check the scoreboard (step 85), it is identified which region in the scoreboard for the earlier pass includes the rendering task on which the current rendering task potentially depends (step 86). If the counter for that region has decremented to zero (step 87—yes), indicating that the corresponding rendering task for the earlier render pass has completed its processing, it is determined on this basis that the dependency has resolved, and the scoreboard check can be passed (step 89). On the other hand, if the counter for that region is not equal to zero (step 87—no), indicating that there are at least some rendering tasks in that region that have not completed, a wait is implemented (step 88) until the scoreboard is updated.

Various other arrangements would be possible, e.g. depending on the configuration of the scoreboard.

Figure 9:
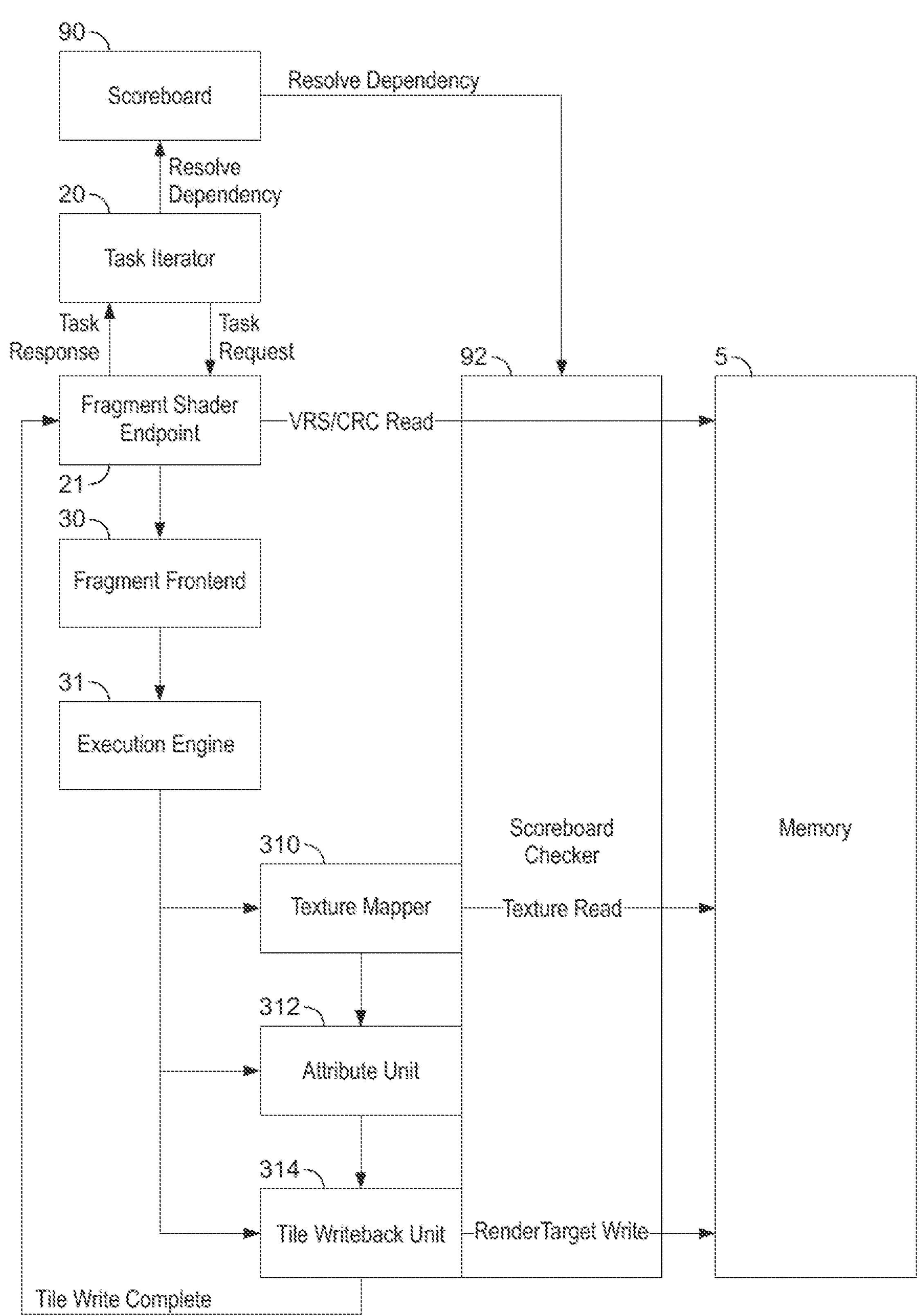
FIG. 9 illustrates the operation of a graphics processor according to an embodiment.

In this way, it is possible to control the processing of rendering task within the shader cores in order to enforce data dependencies. That is, rather than strictly enforcing processing barriers between rendering jobs within the job manager circuit (a command stream frontend circuit) 35, it is possible to move the dependency management between rendering jobs into the graphics processor hardware, with the dependencies being checked at the point at which a memory access is required. This is illustrated in FIG. 9. FIG. 9 thus illustrates the operation of a graphics processor according to an embodiment.

As shown in FIG. 9, and as described above, the task iterator 20 controls the scheduling and issuing of tasks to the shader cores for processing, via the fragment shader endpoint 21. The fragment shader endpoint 21 for a shader core then issues rendering tasks for processing by the graphics processing pipeline that is being implemented by the respective shader core, e.g. by first executing the fragment frontend processing 30, and then passing any surviving fragments to the execution engine 31 for execution of the required fragment shader programs. The fragment shader program then performs the desired rendering.

There are various points within the graphics processing pipeline where memory access may be required and where the memory access may potentially require access to a data buffer that is written by an earlier rendering job. According to the present embodiments, as described above, the scoreboard 90 can thus be (and is) used whenever such memory accesses are required in order to enforce any potential data dependencies between rendering jobs.

For example, as shown in FIG. 9, the fragment shader endpoint 21 may need to read in from memory 5 certain state information or parameters such as variable rate shading parameters, or tile signatures for transaction elimination, e.g. in the form of a CRC buffer. However, these parameters may in turn be generated by an earlier rendering job (e.g. within a previous render pass). Thus, the fragment shader endpoint 21, prior to reading in any such parameters, is operable and configured to check the scoreboard 90 to see if any potential data dependencies exist, and if so, check whether they are resolved. (This can then be done as described above using the dependent reader operation shown in FIG. 7.)

Similarly, the execution engine 31 when executing a shader program may at various points during shader program execution require memory access. For instance, an example of this would be when the rendering task requires a texture to be read in via the texture mapper unit 310 of the execution engine 31. However, again, the required texture may have been generated by an earlier rendering job within a previous render pass, e.g. as a "render to texture" output. Accordingly, the texture mapper unit 310 may perform the texture read via a suitable scoreboard checker 92 that is operable to and configured to check whether or not the dependency is resolved.

A similar situation occurs for reads through the attribute unit 312 which can again be performed via the scoreboard checker 92, in the same manner as described above.

When the rendering task is completed, the tile writeback unit 314 can then write the output (render target) accordingly to the memory 5. This is then signalled appropriately to the fragment shader endpoint 21 which in turn can signal this information to the scoreboard 90 to cause an appropriate update of the scoreboard 90 associated with the current rendering job.

Thus, as shown in FIG. 9, the fragment shader endpoint 21 in an embodiment triggers and controls updating of the scoreboard 90 for the current rendering job. Then, during the processing of the current rendering job, the scoreboard checker 92 within the shader core is operable and configured to check, as necessary, the corresponding scoreboard 90 for an earlier rendering job to ensure any data dependencies are resolved prior to performing any memory access to a potentially dependent resource.

FIG. 6 above shows an example of a so-called 'read-after-write' dependency between two render passes, which 'read-after-write' dependency can be handled as described above.

Figure 10:
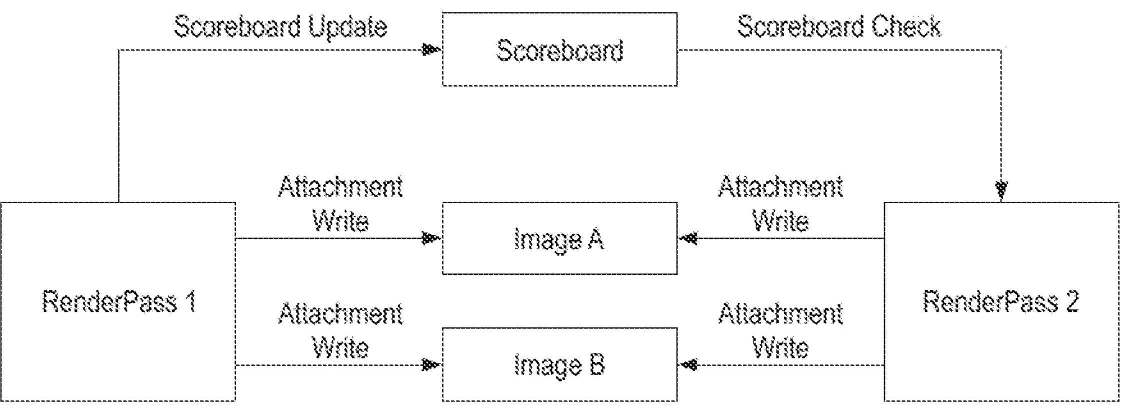
FIG. 10 shows an example of a so-called 'write-after-write' dependency between two render passes.

FIG. 10 shows an example of a so-called 'write-after-write' dependency between two render passes, where the later render pass overwrites a render target (image) that is also written to by the earlier render pass. These dependencies can generally be handled similarly to the 'read-after-write' dependencies illustrated in FIG. 6, using the techniques described above.

However, it will be appreciated that there may be other situations, or types of dependencies, that cannot be handled in this way.

Figure 11:
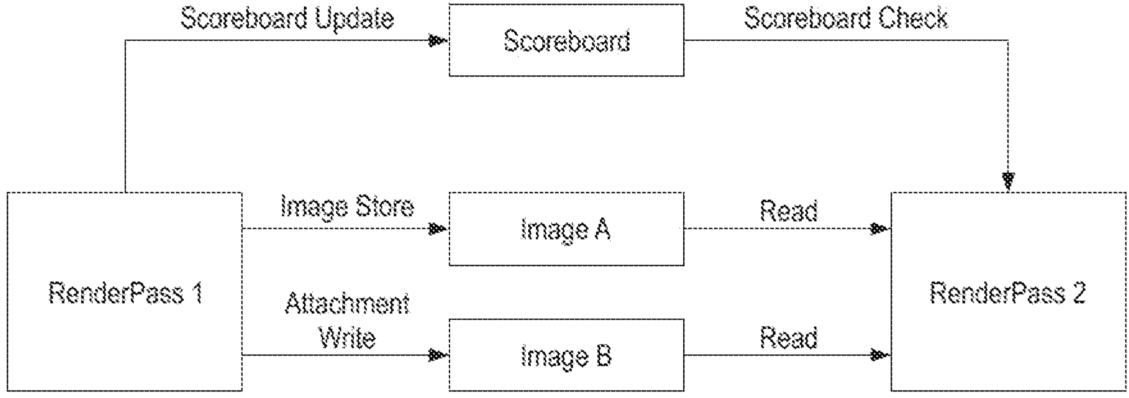
FIG. 11 shows an example of a shader side effect that may be present within a render pass.

An example where the job manager circuit (a command stream frontend circuit) 35 may need to enforce a hard processing barrier may be where a render pass includes 'side effects'. An example of this is shown in FIG. 11 where the earlier render pass performs an 'Image Store' operation for a render target (ImageA) that is to be read by the later render pass. This Image Store operation may be present within any arbitrary one of the rendering tasks for the earlier render pass, and this may not be known in advance, and so it is not generally safe to start processing the later render pass in this situation until all of the rendering tasks for the earlier render pass have completed.

Another example of this might be a 'write-after-read' dependency where a rendering job for a later render pass may write to a render target (image) that a rendering job for an earlier render pass potentially needs to read from. In that case, the read operations may generally be unconstrained such that a read may be performed as part of any one of the rendering tasks for the rendering job for the earlier render pass. In that case, it may be not be safe to start issuing any rendering tasks for the later render pass, and a hard processing barrier may therefore be enforced by the job manager circuit (a command stream frontend circuit) 35.

Various other examples would be possible.

Figure 12:
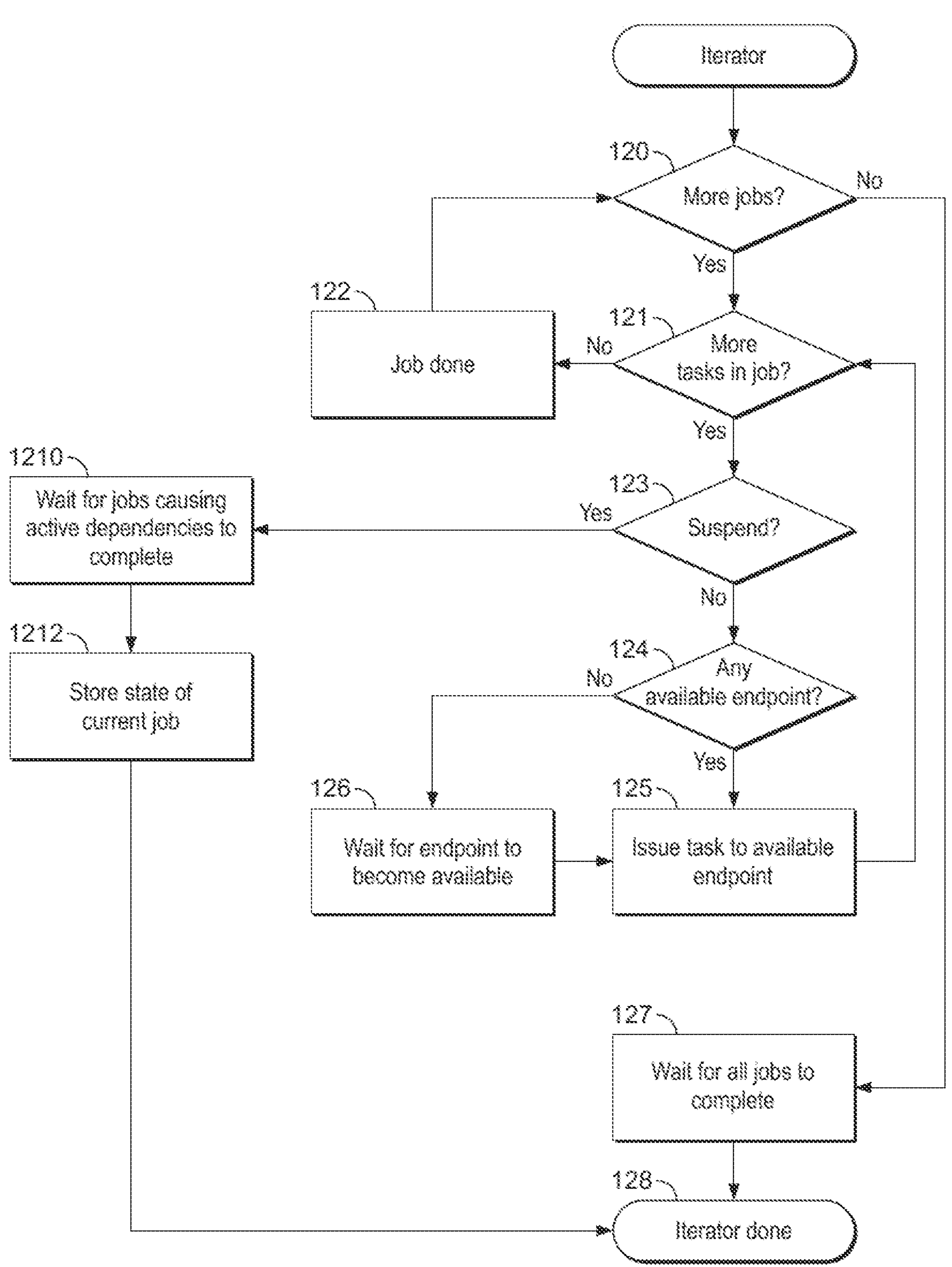
FIG. 12 is a flow chart illustrating a suspend mechanism according to an embodiment.

FIG. 12 is a flow chart illustrating a mechanism for suspending performing a sequence of rendering jobs according to an embodiment. As shown in FIG. 12, and as described above, the fragment task iterator 20 is operable and configured to schedule rendering tasks for different rendering jobs to and onto the graphics processing pipeline 10.

Thus, so long as there are more rendering jobs to be performed (step 120—yes), and more rendering tasks to be processed for those jobs (step 121—yes), the fragment task iterator 20 is configured to schedule those rendering tasks to and onto the graphics processing pipeline 10. For example, when scheduling a rendering task, the fragment task iterator 20 checks whether there is an available fragment shader endpoint 21, and if so (step 124—yes), the fragment task iterator 20 schedules the rendering task to that respective shader core (step 125). Otherwise (step 124—no), the fragment task iterator 20 waits for a fragment shader endpoint to become available (step 126).

The scheduling of tasks iterates in this way until there are no more rendering tasks in the current job (step 121—no; at which point that job is done (step 122)), and no more jobs to be performed (step 120—no). Once all rendering tasks for all rendering jobs have been scheduled, the fragment task iterator then waits for all jobs to complete (step 127), at which point the fragment task iterator is done (step 128). The fragment task iterator 20 thus continues in this way for all rendering jobs in a sequence of rendering jobs to be performed.

At some point, the graphics processor may receive a command to suspend performing the current sequence of rendering jobs, e.g. so that the graphics processor can start to perform graphics processing for a new stream of work from another application that may require graphics processing. As shown in FIG. 12, the fragment task iterator 20 is thus configured to check (step 123), prior to attempting to schedule a rendering task to an available fragment shader endpoint (i.e. prior to step 124), whether a command to suspend processing has been received. If no suspend command is received (step 123—no), the task iteration thus proceeds as described above. On the other hand, when a suspend command is received (step 123—yes), the graphics processor is caused to perform a suitable suspend regime to suspend the current processing to allow the graphics processor to switch to processing the new stream of work.

According to the present embodiments, as shown in FIG. 12, when the suspend command is received (i.e. step 123—yes), rather than attempting to immediately suspend processing at this point, the graphics processor is then caused to wait at least until any jobs causing active dependencies have completed their processing (step 1210). Once this has been done, the processing can be safely suspended, and the state of the current job is then stored appropriately (step 1212) to allow the processing to be subsequently resumed. Once the current work has been appropriately suspended, the iteration for the current work stream is then complete (step 128) and the graphics processor can accordingly start scheduling rendering tasks for the new stream of work (which is done in the same manner).

Thus, in the present embodiments, the graphics processor is caused to wait at least until any jobs causing active dependencies have completed their processing (i.e. at step 1210). This is because, as described above, the graphics processor in the present embodiments is operable and configured to concurrently process rendering tasks from different processing jobs (which may, e.g., be rendering jobs for separate render passes, or different rendering jobs within the same render pas). Thus, if a particular rendering task were to be immediately suspended, if that rendering task results in an active dependency for any rendering tasks in a subsequent rendering jobs, the dependency may then be left open, so that any rendering tasks dependent on the particular rendering task cannot then progress to the desired suspend point. This can lead to potential deadlock situations Two main approaches are contemplated for the waiting at least until any jobs causing active dependencies have completed their processing (i.e. step 1210).

Figure 13A:
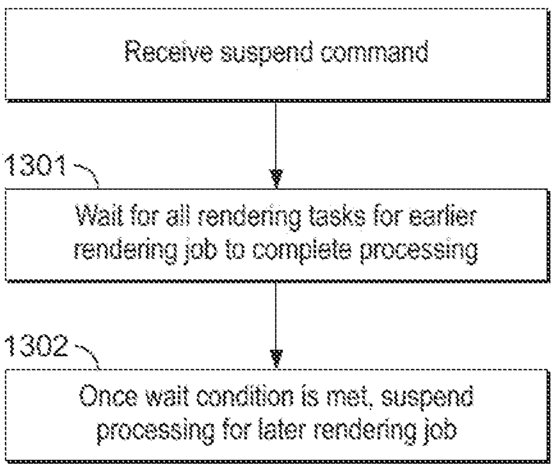
FIG. 13A and FIG. 13B show two examples of wait conditions that may be applied during a suspend mechanism according to an embodiment.

In a first main approach, as illustrated in FIG. 13A, in the case where rendering tasks for a first, earlier rendering job and a second, later rendering job are being concurrently processed, the fragment task iterator 20 is configured to allow all of the rendering tasks for the first, earlier rendering job to complete their processing, before then suspending processing of the second, later rendering job. This then ensures that any possible active dependencies to the earlier rendering job are resolved before the second, later rendering job is suspended. Thus, as shown in FIG. 13A, the suspend operation in this case may comprise waiting for all rendering tasks for the first, earlier rendering job to complete their processing (step 1301), and then, once all rendering tasks for the first, earlier rendering job have completed their processing, suspending processing of the second, later rendering job (step 1302). In this case, the fragment task iterator 20 may or may not stop issuing further rendering tasks for the second, later rendering job during the wait period (i.e. during step 1301). Various arrangements would be possible in this regard.

Figure 13B:
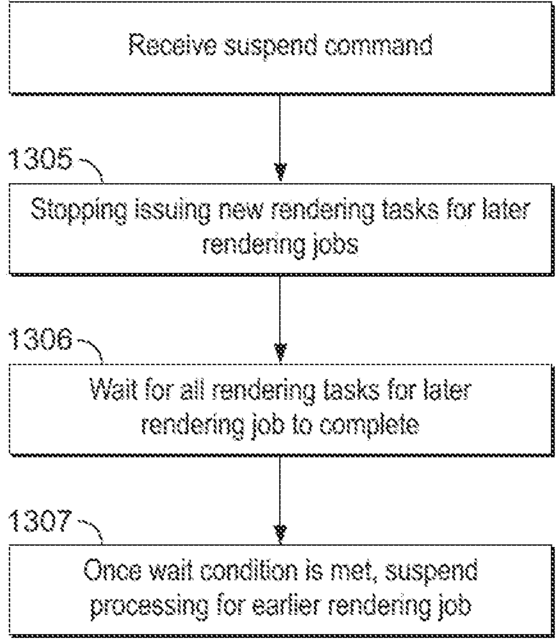

In a second main approach, as illustrated in FIG. 13B, in the case where rendering tasks for a first, earlier rendering job and a second, later rendering job are being concurrently processed, the fragment task iterator 20 is configured to suspend the rendering jobs in reverse order, in particular by stopping issuing any new rendering tasks for the second, later rendering job, but then allowing any rendering tasks that are currently being processed for the second, later rendering job to finish suspending their operation before attempting to suspend processing of the first, earlier rendering job. In this way, again, by ensuring that any rendering tasks for the second, later rendering job that are currently in-flight are allowed to finish their processing, this means that any active dependencies from the second rendering job to the first, earlier rendering job are allowed to resolve before suspending the processing. Thus, as shown in FIG. 13B, the suspend operation in this case may comprise stopping issuing any new rendering tasks for the second, later rendering job (step 1305), but then waiting for all rendering tasks that are currently being processed for the second, later rendering job to complete their processing (step 1306) before attempting to suspend processing of the first, earlier rendering job (step 1307). In this way, rendering tasks for both rendering jobs continue until all of the rendering tasks that were in flight at the point at which the suspend command was received have completed their processing, at which point it is safe to attempt to suspend the first, earlier rendering job.

Note that FIG. 13B shows the particular situation where there are only two rendering jobs running concurrently but in general this approach also scales to any number of rendering jobs. In that case, the attempting to suspend processing of the first, earlier rendering job (i.e. at step 1307) may in turn be performed in a similar manner, e.g. by stopping issuing any new rendering tasks for the first, earlier rendering job but allowing any rendering tasks that are currently being processed for the first, earlier rendering job to complete their processing before attempting to suspend an even earlier, zeroth rendering job that is also running concurrently. That is, as mentioned above, the sequence of rendering jobs in this example can be (and is) suspended in reverse order.

The actual suspend mechanism that is used to suspend performing the sequence of rendering jobs once any wait conditions are met may in general be any suitable and desired suspend mechanism. For example, suitable suspend mechanisms may include those described in either of U.S. Pat. No. 11,127,188 or 11,132,835, or in United States Patent Application (Publication) No. 2022/0020108, all of which are assigned to Arm Limited, and the contents of which are incorporated herein in their entirety.

Figure 14:
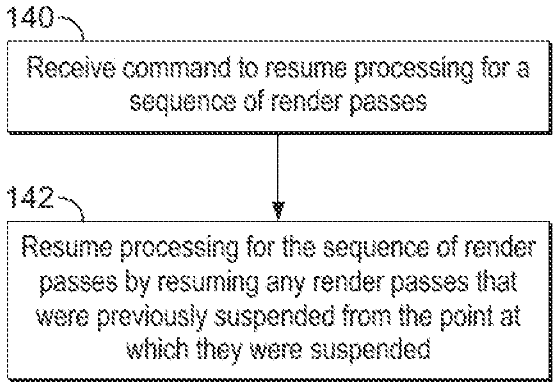
FIG. 14 is a flow chart illustrating a resume operation according to an embodiment.

Once the sequence of rendering jobs for the current graphics processing work stream (application) has been suspended, the graphics processor can accordingly then start to process work for the new stream of work (e.g. for a different application). At some point, the application may require the graphics processor to switch back to processing the original stream of work, i.e. the stream of work that was previously suspended. Thus, as shown in FIG. 14, after suspending a sequence of rendering jobs to start processing a new stream of work, the graphics processor may subsequently receive a command to resume processing the stream of work that was previously suspended (step 140). In that case, the current stream of work may be suspended appropriately, e.g. as described above, and a suitable "resume" operation performed to resume performing the sequence of rendering jobs that was previously suspended. This is done in particular by resuming performing any rendering jobs in the sequence of rendering jobs whose processing was suspended from the point at which their processing was suspended (i.e. the "suspend" point, which as discussed above may be any suitable processing boundary, e.g. it could be a task boundary, but it could also be a processing boundary within a task, depending on the specific "suspend" mechanism that is used) (step 142). The performing of the sequence of render passes can then be resumed accordingly with rendering jobs being processed in the same manner described above.

Various other arrangements would be possible. For instance, in other examples, rather than tracking a 'task completion status', e.g. as described above in relation to FIG. 5A or FIG. 5B, a record may be maintained of which rendering tasks are currently active, with the shader cores being able to query such record in order to determine whether a rendering task has a data (processing) dependency on any rendering task that is already currently being processed (and if so, to control (e.g. stall) at least some processing of the rendering task. This then provides another mechanism for allowing separate rendering jobs to overlap within the shader cores, whilst still enforcing any required dependencies. In this case, when multiple separate rendering jobs are being performed concurrently, in response to a "suspend" command, the suspend mechanism should also be performed as above.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of operating a graphics processor when performing a sequence of rendering jobs, wherein the graphics processor is configured to perform tile-based graphics processing wherein an output for a rendering job is sub-divided into a plurality of rendering tiles, and wherein the rendering job includes a set of rendering tasks for processing to generate the output for the rendering job, the set of rendering tasks comprising rendering tasks that each correspond to one or more rendering tiles of the plurality of rendering tiles, the graphics processor thus configured to generate the output for the rendering job by issuing respective rendering tasks in the set of rendering tasks to a set of one or more processing cores of the graphics processor for processing, and wherein when performing a sequence of rendering jobs, the graphics processor is operable to issue rendering tasks for a later rendering job in the sequence of rendering jobs to the set of one or more processing cores for processing concurrently with rendering tasks for an earlier rendering job in the sequence of rendering jobs, the method comprising:

when the graphics processor is concurrently processing rendering tasks for both a first, earlier rendering job and a second, later rendering job in the sequence of rendering jobs, wherein at least some processing of one or more rendering tasks for the second, later rendering job in the sequence of rendering jobs depends on processing of one or more rendering tasks for the first, earlier rendering job in the sequence of rendering jobs:

in response to a command for the graphics processor to suspend performing the sequence of rendering jobs:

waiting at least until any rendering tasks for the first rendering job on which the processing of a rendering task for the second rendering job depends have completed processing before suspending processing of the sequence of rendering jobs, such that:

when a first rendering task corresponds to one or more rendering tiles for the first rendering job and a second rendering task for the second rendering job depends on processing of the first rendering task, the processing of the first rendering task is completed for the one or more tiles that the first rendering task corresponds to before suspending processing of the sequence of rendering jobs.

2. The method of claim 1, wherein in response to the command to suspend the performing of the sequence of rendering jobs, the method comprises waiting until all rendering tasks that are currently being processed for one of the first and second rendering jobs have completed processing before suspending processing of the other one of the first and second rendering jobs.

3. The method of claim 1, wherein in response to the command to suspend the performing of the sequence of rendering jobs, the method comprises waiting until all of the rendering tasks for the first rendering job have completed processing before suspending processing of the sequence of rendering jobs.

4. The method of claim 3, comprising: once all of the rendering tasks for the first rendering job have completed processing, suspending processing for any outstanding rendering tasks for the second rendering job.

5. The method of claim 4, comprising subsequently resuming the second rendering job from the point at which the second rendering job was suspended.

6. The method of claim 1, wherein in response to the command to suspend the performing of the sequence of rendering jobs, the method comprises: stopping issuing any further rendering tasks for the second rendering job for processing; and before attempting to suspend processing for the first rendering job: waiting for any rendering tasks for the second rendering job that are currently being processed to complete processing.

7. The method of claim 6, wherein once all rendering tasks for the second rendering job that are currently being processed have completed processing, such that there are no outstanding active dependencies between the second rendering job and the first rendering job, but there are still outstanding rendering tasks for the first rendering job, the method comprises suspending processing for the first rendering job.

8. The method of claim 7, wherein when the first rendering job and the second rendering job are both suspended, the method comprising subsequently resuming processing the first rendering job from a point at which the first rendering job was suspended and resuming processing the second rendering job from a point at which the second rendering job was suspended.

9. The method of claim 1, wherein in response to the command to suspend the performing of the sequence of rendering jobs, the method comprises identifying which processing cores are currently only processing rendering tasks for the second rendering job, and suspending the processing by the identified processing cores.

10. The method of claim 1, further comprising: once the processing of the sequence of rendering jobs has been suspended, performing a new sequence of rendering jobs.

11. A graphics processor comprising:

a set of one or more processing cores; and a control circuit operable and configured to:

when the graphics processor is performing a sequence of rendering jobs:

wherein the graphics processor is configured to perform tile-based graphics processing wherein an output for a rendering job is sub-divided into a plurality of rendering tiles, and wherein the rendering job includes a set of rendering tasks for processing to generate the output for the rendering job, the set of rendering tasks comprising rendering tasks that each correspond to one or more rendering tiles of the plurality of rendering tiles, the graphics processor thus configured to generate the output for the rendering job by issuing respective rendering tasks in the set of rendering tasks to a set of one or more processing cores of the graphics processor for processing, and wherein when performing a sequence of rendering jobs, the graphics processor is operable to issue rendering tasks for a later rendering job in the sequence of rendering jobs to the set of processing cores for processing concurrently with rendering tasks for an earlier rendering job in the sequence of rendering jobs, and wherein the graphics processor is operable for at least some processing of a rendering task for a later rendering job in the sequence of rendering jobs to depend on processing of a rendering task for an earlier rendering job in the sequence of rendering jobs:

in response to a command for the graphics processor to suspend performing a sequence of rendering jobs received when rendering tasks for both a first, earlier rendering job and a second, later rendering job in the sequence of rendering jobs are being concurrently processed by one or more of the graphics processor processing cores:

cause the graphics processor to wait at least until any rendering tasks for the first rendering job on which the processing of a rendering task for the second rendering job depends have completed processing before suspending processing of the sequence of rendering jobs, such that:

when a first rendering task corresponds to one or more rendering tiles for the first rendering job and a second rendering task for the second rendering job depends on processing of the first rendering task, the processing of the first rendering task is completed for the one or more tiles that the first rendering task corresponds to before suspending processing of the sequence of rendering jobs.

12. The graphics processor of claim 11, wherein in response to the command to suspend the performing of the sequence of rendering jobs, the control circuit is configured to cause the graphics processor to wait until all rendering tasks that are currently being processed for one of the first and second rendering jobs to have completed processing before suspending processing of the other one of the first and second rendering jobs.

13. The graphics processor of claim 11, wherein in response to the command to suspend the performing of the sequence of rendering jobs, the control circuit is configured to cause the graphics processor to wait until all of the rendering tasks for the first rendering job have completed processing before suspending processing of the sequence of rendering jobs.

14. The graphics processor of claim 13, wherein the control circuit is configured to: once all of the rendering tasks for the first rendering job have completed processing, suspend any outstanding rendering tasks for the second rendering job.

15. The graphics processor of claim 14, wherein in response to the graphics processor subsequently receiving a command to resume performing the sequence of rendering jobs, the control circuit is configured to resume the second rendering job from the point at which the second rendering job was suspended.

16. The graphics processor of claim 11, wherein in response to the command to suspend the performing of the sequence of rendering jobs, the control circuit is configured to: stop a task issuing circuit of the graphics processor issuing any further rendering tasks for the second rendering job for processing; and before attempting to suspend processing for the first rendering job: cause the graphics processor to wait for any rendering tasks for the second rendering job that are currently being processed to complete processing.

17. The graphics processor of claim 16, wherein once all rendering tasks for the second rendering job that are currently being processed have completed processing, such that there are no outstanding active dependencies between the second rendering job and the first rendering job, but there are still outstanding rendering tasks for the first rendering job, the control circuit is configured to suspend processing for the first rendering job.

18. The graphics processor of claim 17, wherein when the first rendering job and the second rendering job are both suspended, in response to the graphics processor subsequently receiving a command to resume performing the sequence of rendering jobs, the control circuit is configured to resume processing the first rendering job from a point at which the first rendering job was suspended and resuming processing the second rendering job from a point at which the second rendering job was suspended.

19. The graphics processor of claim 11, wherein in response to the command to suspend the performing of the sequence of rendering jobs, the control circuit is configured to identify which processing cores are currently only processing rendering tasks for the second rendering job, and suspend the processing by the identified processing cores.

* * * * *